United States Patent [19]

Bridges et al.

[11] Patent Number: 4,875,103
[45] Date of Patent: Oct. 17, 1989

[54] APPARATUS AND METHOD FOR ALIGNING A REPOSITIONABLE IMAGING SENSOR WITH A PHOTOGRAPHIC IMAGE IN A FILM VIDEO SYSTEM

[75] Inventors: Mark E. Bridges, Spencerport; Robert W. Easterly, Churchville; John R. Fredlund, Rochester, all of N.Y.

[73] Assignee: Eastman Kodak Company, Rochester, N.Y.

[21] Appl. No.: 233,783

[22] Filed: Aug. 19, 1988

[51] Int. Cl.$^4$ ............................................. H04N 3/36
[52] U.S. Cl. ..................................... 358/214; 358/139
[58] Field of Search ............................... 358/214–216, 358/54, 139, 10

[56] References Cited

U.S. PATENT DOCUMENTS

| | | | |
|---|---|---|---|
| 4,054,918 | 10/1977 | Kamogawa et al. | 358/214 |
| 4,104,680 | 8/1978 | Holland | 358/216 |
| 4,485,406 | 11/1984 | Brownstein | 358/214 |
| 4,506,300 | 3/1985 | Fearnside | 358/214 |
| 4,593,308 | 6/1986 | Kemplin | 358/139 |
| 4,603,966 | 8/1986 | Brownstein | 358/54 |
| 4,605,960 | 8/1986 | Cohen | 358/139 |
| 4,688,099 | 8/1987 | Funston | 358/214 |
| 4,819,073 | 4/1989 | Bridges | 358/214 |

Primary Examiner—Jin F. Ng
Assistant Examiner—Stephen Brinich
Attorney, Agent, or Firm—Robert M. Wallace

[57] ABSTRACT

In a film video system, a repositionable imaging solid state sensor is used to generate electric signals in reponse to a photographic image for display on a video monitor. The repositionable sensor is aligned with the photographic image by locating a fixed mask between a source for illuminating the image and the sensor. Corner pixels of the sensor are identified, and the sensor is moved relative to the mask. When at least one of these corner pixels transition between a light and dark state during movement of the sensor, it is indicative of the presence of an edge of the mask. By moving the sensor and calculating the distance between edges of the mask, the sensor may be aligned with the mask. Since the mask is aligned with the photographic image, the sensor is aligned with the photographic image.

11 Claims, 44 Drawing Sheets

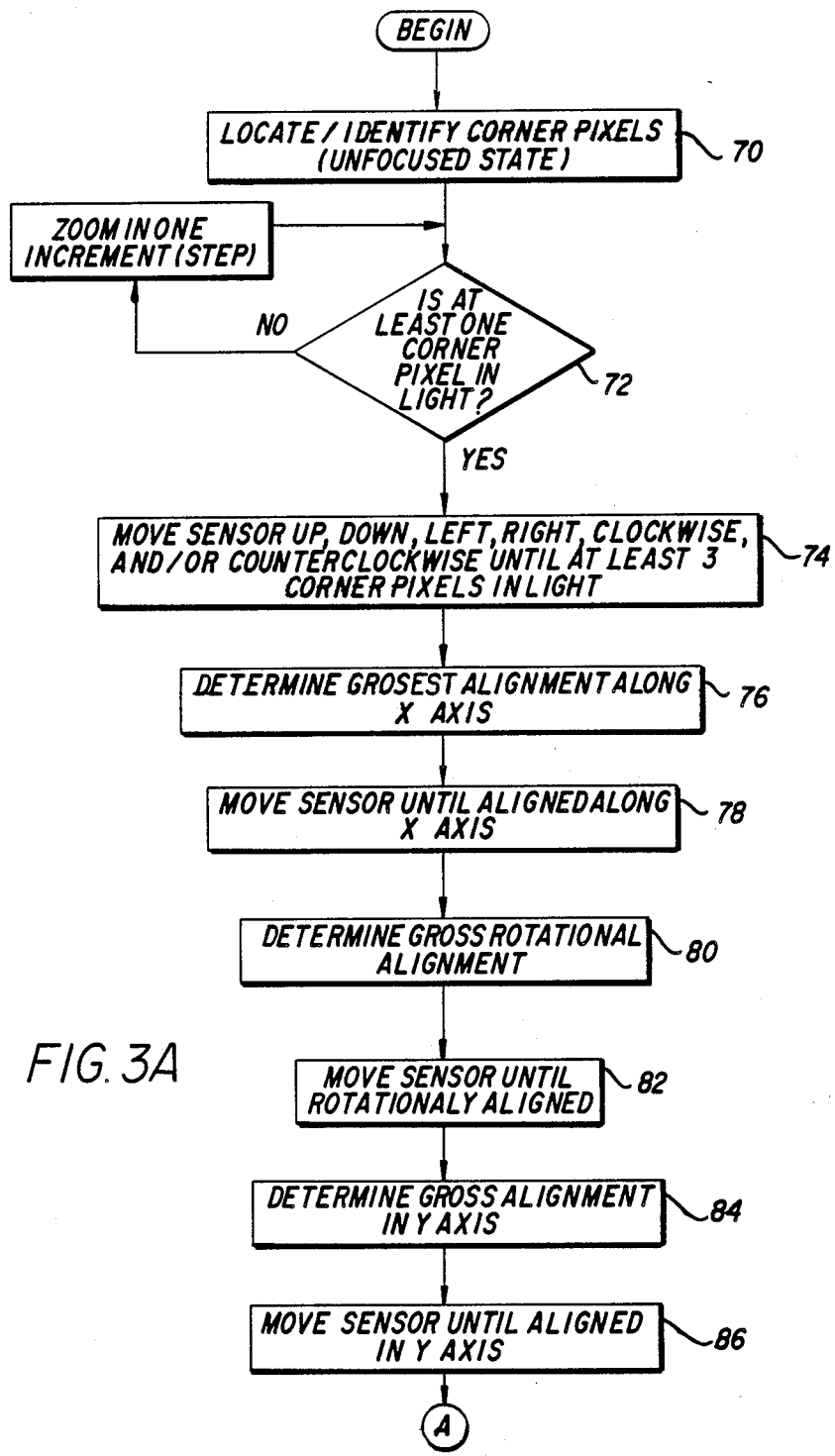

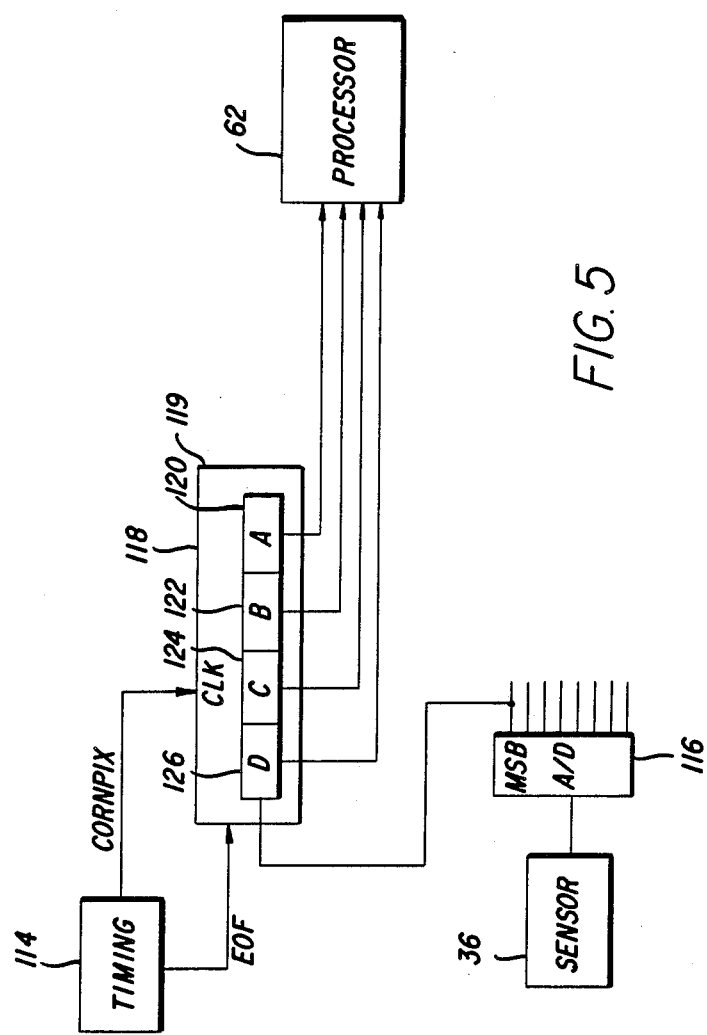

|  | A | B | C | D |  |
|---|---|---|---|---|---|
| | | ALWAYS BAD | INCONSISTENTLY BAD | | |
| APERTURE OPEN | 1 | 1 | 1 | 1 | SAVCORNPIX |
| APERTURE CLOSED | 0 | 1 | 0 | 0 | CLOCORNPIX |
| COMPLEMENT CLOCORNPIX | 1 | 0 | 1 | 1 | CORNPIXCOMP |
| AND CORNPIXCOMP WITH SAVCORNPIX | 1 | 0 | 1 | 1 | ANCORNPIX |
| APERTURE OPEN | 1 | 1 | 0 | 1 | OPCORNPIX |
| AND OPCORNPIX WITH ANCORNPIX | 1 | 0 | 0 | 1 | 2ANCORNPIX |

1 = LIGHT PIXEL
0 = DARK PIXEL

FIG. 7

APPARATUS AND METHOD FOR ALIGNING A REPOSITIONABLE IMAGING SENSOR WITH A PHOTOGRAPHIC IMAGE IN A FILM VIDEO SYSTEM

TECHNICAL FIELD

The present invention pertains to a film video system which utilizes a repositionable solid state imager to generate signals from a nonrepositionable photographic image. More particularly, the present invention pertains to apparatus and methods for aligning the repositionable imager with the photographic image in order to properly generate the image signals.

BACKGROUND OF THE INVENTION

In a video system which utilizes a repositionable solid state sensor for generating image signals from a photographic image, it may be necessary to align the sensor with the photographic image prior to, for example, initial power up from the video system.

For example, in U.S. application Ser. No. 07/143,661, now U.S. Pat. No. 4,819,073, entitled "Film Video Player Apparatus", an apparatus for sensing a photographic color film and for converting a sensed photographic image into a video signal is disclosed. The above identified application deals with a film player in which relative vertical, horizontal and rotational translation is effected between the photographic image and a CCD imaging sensor. This application is assigned to the assignee of the present invention, and the contents of this application are incorporated herein by reference.

A conventional approach to the design of film video players contemplates the use of fixed apparatus for mounting a slide or negative (representing a film image) and a fixed sensor which is spaced a distance therefrom along the optical axis of the system. Interposed between the fixed film image and the fixed sensor is a multi-group variable focal length lens wherein one of the lens elements is movable axially along the optical axis to vary the focal length of the lens and thus provide a zoom capability. Such multi-group variable focal length lenses normally require the driving of a plurality of cam surfaces to effect the zoom functions. This can result in an intricate and expensive mechanism.

To overcome these and other problems, the film video player of the incorporated application includes at least one film gate for mounting photographic film in relation to an imaging mechanism having a lens for projecting at least a portion of a film image onto an imaging sensor. The sensor converts the sensor image to an electrical signal which is then converted to a video signal for display of the image on a monitor. The film player includes a zoom mechanism for changing the magnification of the sensor image with respect to the film image and a scan mechanism for translating the sensor with respect to the film image in a first direction. Also included are a gear assembly for both translating the sensor with respect to the film image in a second direction which is perpendicular to the first direction, and for rotating the sensor with respect to the film image.

In this system due to misalignment of the repositionable sensor and the photographic image (which is typically in the form of a negative or slide), it may be necessary to align the sensor with the film image in order to generate a proper video display. More specifically, accidental misalignment between the photographic image and sensor may occur during transportation of the film video player. Misalignment also may occur, for example, when the film video player is shut off after use in a condition where the system has been zoomed to focus on a corner of the photographic image. To overcome this misalignment, an exemplary embodiment of the present invention provides for alignment of the repositionable sensor with the film image during initial power up of the film video player using the image of a pixel mask lying in a plane displaced from (or, alternatively, coincident with) the plane of the film image.

The invention is suitable for transfering to video an image on a photographic medium such as a film or a print. In the former case, light from the source is transmitted through the photographic medium to the sensor while in the latter case light from the source is reflected from the image-bearing surface of the print to the sensor.

BRIEF DESCRIPTION OF THE DRAWINGS

These and other advantages of the present invention will become more readily apparent upon reading the following detailed description in conjunction with the attached drawings, in which:

FIGS. 3A and 3B illustrate an overview flowchart for achieving the alignment function of the present invention;

FIG. 5 is a simplified block diagram illustrating those elements responsible for locating and identifying the corner pixels of the sensor;

FIG. 7 is a chart which illustrates the method for identifying the defective corner pixels;

DETAILED DESCRIPTION

In general, the present invention pertains to a video system which incorporates a repositionable solid state imaging sensor, as well as one or more gates for holding a photographic image, and a mechanism for aligning the sensor with the photographic image. In an exemplary embodiment, the present invention pertains to an alignment mechanism for a film video player generally indicated at 20 in FIG. 1. Before proceeding with a discussion of the alignment mechanism of the present invention, a discussion of the exemplary film video player will be provided.

Figure 1:
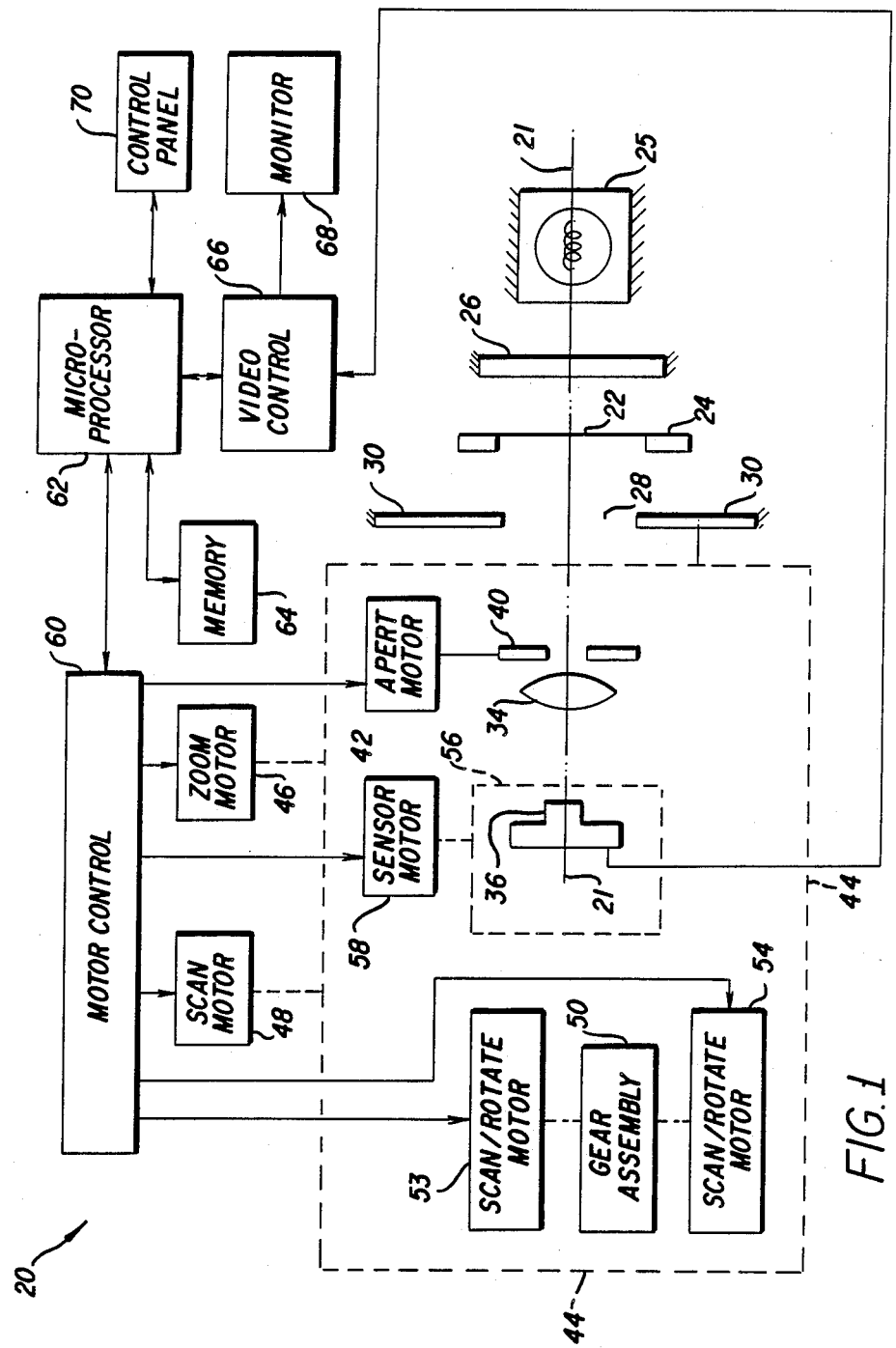
FIG. 1 is a simplified block diagram of an exemplary embodiment of the present invention in which a film video player incorporates a unique sensor alignment apparatus and method.

As shown in FIG. 1, the film video player includes a number of imaging elements which are centered about an optical axis which is designated by a line having the number 21. The imaging elements include a photographic image 22 which is supported by a gate 24, and a light source 25 which illuminates the image through a diffuser 26. The light from the image is transmitted through an opening 28 of a fixed mask 30 which limits the size of the source image emanating from the image plane. The image is focused by a lens 34 onto a solid state imaging sensor 36.

The elements of the optical system are centered upon the optical axis 21 of the film player. Fixed focal length lens 34 is also positioned on optical axis 21 at a variable distance from the film plane 22. Interposed between the mask 30 and the lens 34 is an aperture mechanism 40 which may be designed according to known parameters for conformance with operatively interrelated elements of the film video player and which may be opened and closed by a suitable aperture motor 42. Displaced to the other side of the lens 34 from the aperture mechanism 40 is the video image sensor 36 upon which the film image is directed by the lens 34. The video image sensor 36 may be a charge coupled device of any of the various types which are well known in the art and which produce an image signal as an output. The light source 25, diffuser 26 and mask 30, in addition to being centered upon optical axis 21, are also stationary or fixedly mounted axially along the optical axis 21.

The lens 34 and the sensor 36 are mounted in a manner to permit the independent motion of each axially along the optical axis 21. In addition, the lens 34 and the sensor 36 are mounted to permit selective scan or translation in all directions, as well as rotation in any plane which is perpendicular to the optical axis 21 within the limits of travel of the lens 34 and the sensor 36 axially along the optical axis 21.

The above general description of film video player 20 is for purposes of depicting a type of system which has both a fixed focal length lens, and a sensor which moves axially, translationally in two mutually perpendicular directions, and rotationally in two directions about the optical axis 21. The structural details and operative interrelationships of the exemplary film video player having these characteristics will be described somewhat briefly below and in greater detail in the aforementioned co-pending U.S. application Ser. No. 143,661.

As illustrated in exemplary fashion in the above application, the lens 34 and the sensor 36 are jointly movable axially along the optical axis 21, which may be referred to as the Z axis, by virtue of their structural interrelationship with a carriage 44 (shown schematically by dashed lines in FIG. 1), the mechanical details of which are not relevant to the present invention. Carriage 44 may be driven along the optical axis by a zoom motor 46 which is preferably a stepper motor whose shaft can be rotated through a selected number of highly accurate angular increments. The angular motion of the shaft of zoom motor 46 may be translated in any suitable manner such as by a drive pulley to effect accurate linear travel of carriage 44 which supports lens 34 and sensor 36 along optical axis 21.

Figure 2:
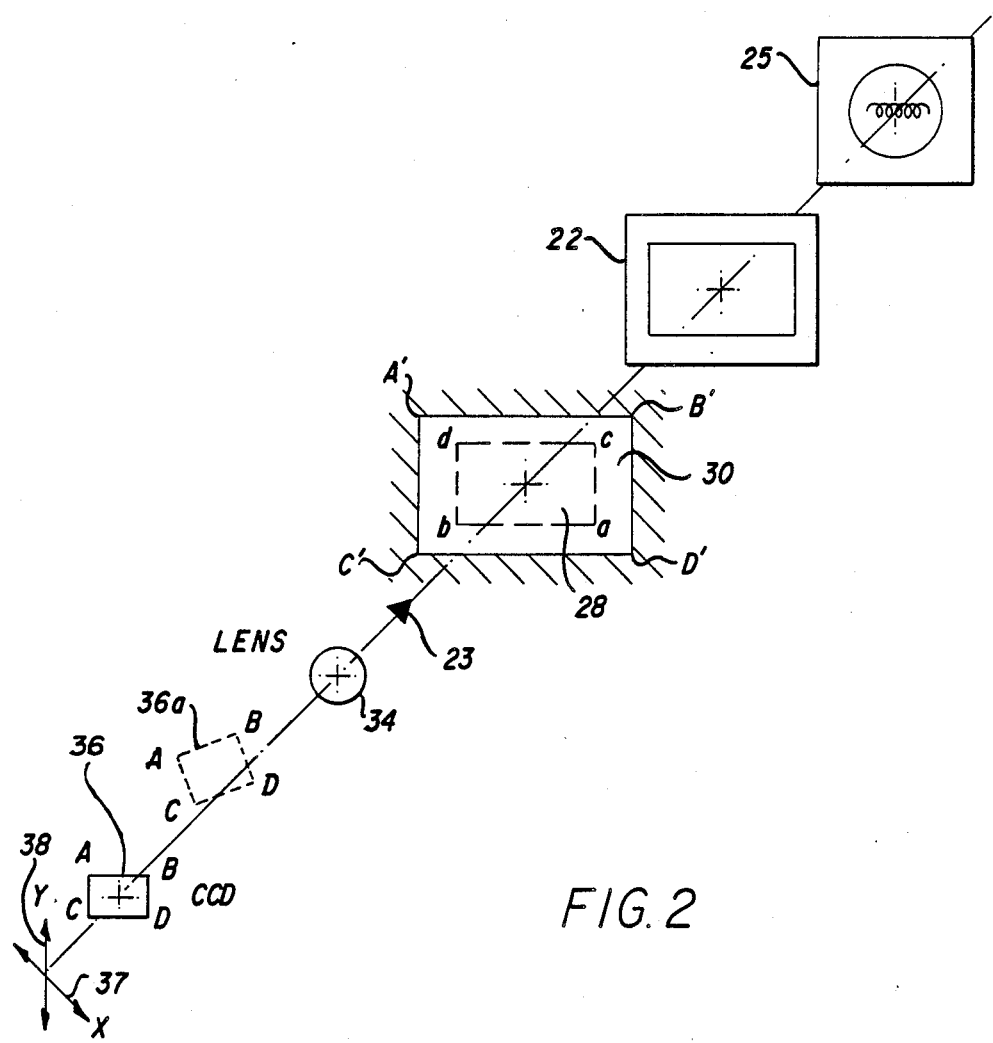
FIG. 2 is a simplified diagram of the arrangement of the sensor, lens, mask, film image and light source of the exemplary film video player.

Lens 34 and sensor 36 also move jointly along another axis designated by the number 37 in FIG. 2, which may be referred to as the horizontal or X axis. Carriage 44 (FIG. 1) may be driven along the X axis by a scan motor 48 which is preferably a stepper motor like that preferred for use as zoom motor 46.

Lens 34 and sensor 36 also are jointly scannable along a vertical or Y axis, designated by the number 38 in FIG. 2, which is perpendicular to the Y axis. Y direction scanning and rotation is achieved by virtue of the structural interrelationship with a gear assembly 50 (FIG. 1) or other suitable mechanism, the mechanical details of which are not relevant to the present invention. In addition lens 34 and sensor 36 are jointly rotatable about the optical axis 21. Scanning along the Y axis as well as rotation about the optical (Z) axis may be accomplished by the selective operation of scan/rotate motor 53 and a scan/rotate motor 54, as set forth more fully in the aforementioned U.S. application Ser. No. 143,661.

As will be discussed below, sensor 36 is necessarily positioned at a different axial distance from lens 34 for every different zoom position of carriage 44 reflecting magnification of a film image. Sensor 36 is carried by a sensor carriage 56 (shown schematically by dashed lines in FIG. 1) which is movable axially along optical axis 21 to selectively vary the axial distance between sensor 36 and lens 34. Sensor carriage 56 may be driven axially by a sensor motor 58, which is preferably a stepper motor like that preferred for use as zoom motor 46.

Aperture motor 42, zoom motor 46, scan motor 48, scan/rotate motors 53, 54, and sensor motor 58 all may be conventional stepper motors. More specifically, each of the aforementioned motors is controlled by a respective conventional slave processor (not shown) to actuate the desired stepper motor for the number of steps necessary to achieve the desired translation or rotation. These slave processors are under the command of a conventional master processor 62 (FIG. 1). In communication with master processor 62 over conventional address and data buses and control lines is (i) a memory 64, (ii) a video display control 66 for receiving the output of sensor 36 and interfacing to a video monitor 68, and (iii) an appropriate operator console panel 70 for inputting commands to processor 62.

Having described the operation of the film video player, attention will now be turned to the mechanism for aligning the translatable and rotatable sensor 36 with the film image. Referring again to FIG. 2 there is shown a simplified view of the light source 25, film image 22 (photographic slide), mask 30, lens 34 and CCD imager 36 which is in an aligned position in solid lines designated by the number 36, and in a misaligned position in dashed lines designated by the number 36a. For exemplary purposes the misaligned sensor is shown to be in a rotated position at the upper left corner of the film and at increased magnification (the concurrent repositioning of the lens 34 to maintain focus is not shown in FIG. 2). In the present invention, the opening 28 in the fixed mask 30 is used as a reference to align the sensor 36 with the film image 22. More specifically, the mask opening 28 corresponds to the rectangular shape of the film image and the sensor. Alignment is achieved when respective sides AB, BD, CD, and AC of the sensor 36 are respectively aligned with respective sides cd, ac, ab, and bd of the edges of mask opening 28. In this description, A, B, C, and D represent the corners of the sensor 36 where active pixels are generated, whereas a, b, c, and d represent the corners of the mask opening 28.

In an exemplary embodiment, the alignment operation is under the control of a software program implemented by the processor 62. An overview of this program can be seen by referring to FIG. 3 where at flowblock 70 alignment is accomplished by first identifying the locations of at least one pixel at each corner A, B, C, D of the sensor 36. A determination is then made at decision block 72 whether at least one of the corner pixels A, B, C, or D is illuminated through the mask opening 28 by the light source 25 (FIG. 2). If this condition is false, the sensor is zoomed toward the mask 30 until the condition is true, or until a default condition is reached (a predetermined number of incremental steps) indicating an error in the system.

Figure 4A:
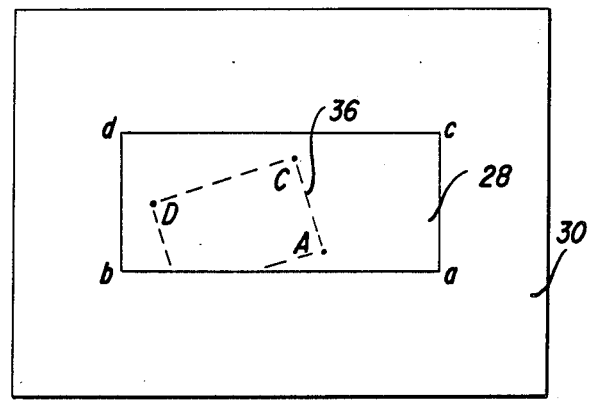
FIGS. 4A through 4J illustrate the locations of corner pixel images of the sensor relative to an opening in the mask during the alignment procedure.

It should be appreciated that alignment of the sensor 36 with the mask opening is accomplished by detecting when the identified corner pixels transition from the illuminated state (light) to a nonilluminated state (dark) due to the presence of the mask 30. The relevance of this transition between the light and dark states can be seen in the following alignment example. Referring to FIG. 4 there is shown the mask 30, mask opening 28, and an image 36' of the corner pixels of the sensor 36 (FIG. 1) as seen from a location in front of the mask 30 in FIG. 2 looking along the optical axis 21 in the direction of arrowhead 23. In FIG. 4A, corner pixels A, C, and D are exposed to the light source, while light to corner pixel B is blocked by the mask 30.

Figure 4B:
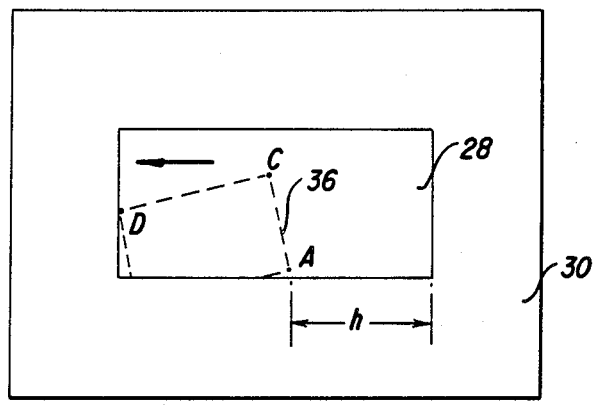
Figure 4C:
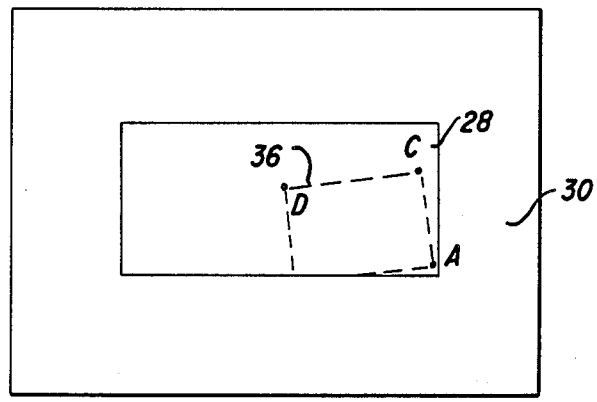
Figure 4D:
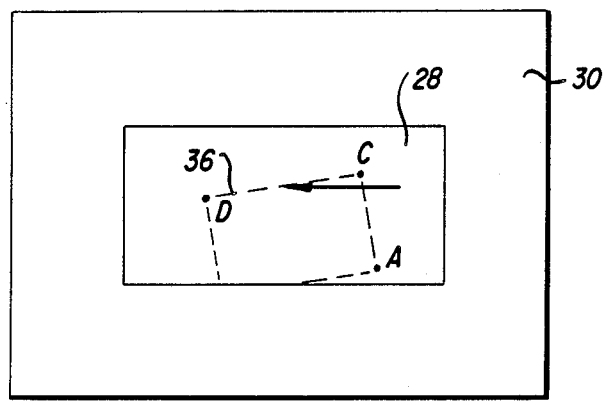

Leftward movement of the sensor along the X axis from the miscentered position shown in FIG. 4A to the position shown in FIG. 4B will cause corner pixel D to darken because the light to corner pixel D is blocked by the mask. In this manner the location of the left edge of the mask is established. Subsequent movement of the sensor in a rightward direction until the A corner pixel darkens (FIG. 4C) establishes the mask right angle. The number of steps required to move the sensor from the left edge to the right edge along the X axis is stored as count h. Then by moving the sensor from the right edge in the left direction by a count which is equal to one half the h count, the sensor is approximately aligned (grossest horizontal alignment in FIG. 4D) along the X axis.

Figure 4E:
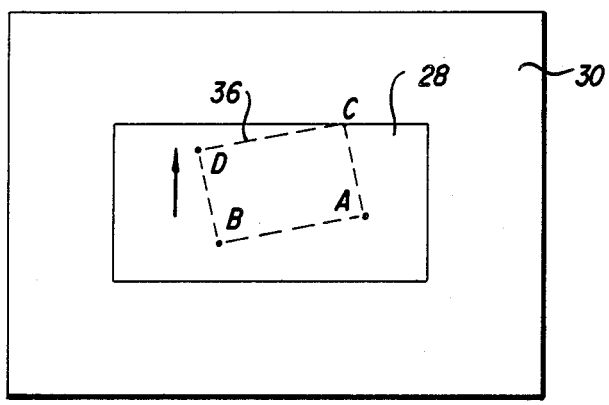
Figure 4F:
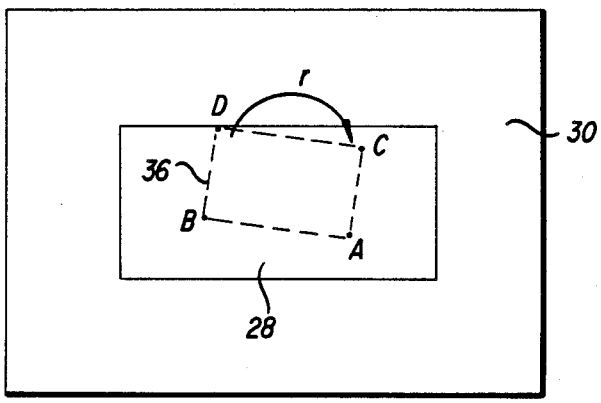

In order to achieve a gross rotational alignment, the sensor then is moved upward until one of the upper corner pixels go dark (FIG. 4E). It should be appreciated that a gross or rough alignment is accomplished first in the horizontal, rotational and vertical directions, followed by a focusing operation, and then a fine alignment in the horizontal, rotational and vertical directions. Therefore, if corner pixel C goes dark first, it indicates that the sensor is oriented as shown in FIG. 4E. Therefore the sensor is rotated a number of steps in a clockwise direction until corner pixel D goes dark (FIG. 4F). The sensor is then rotated in a counterclockwise direction one half the number of rotational steps r in order to place the sensor at the location shown in FIG. 4G.

Figure 4I:
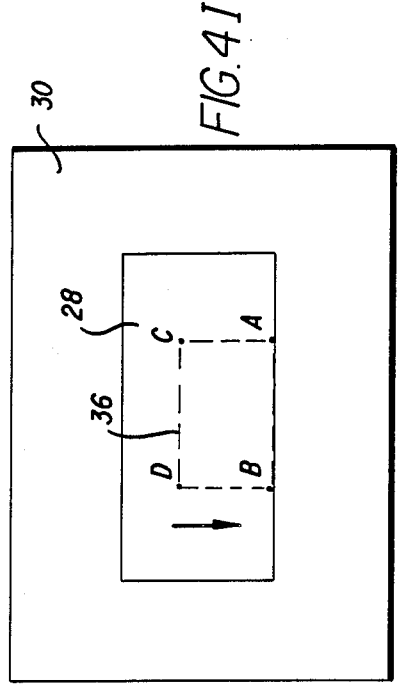
Figure 4J:
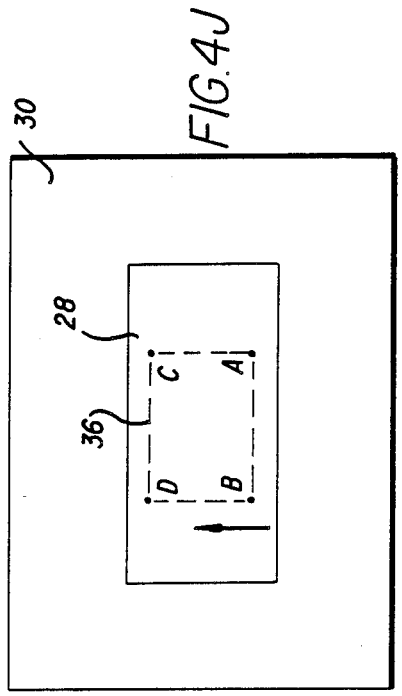
Figure 4G:
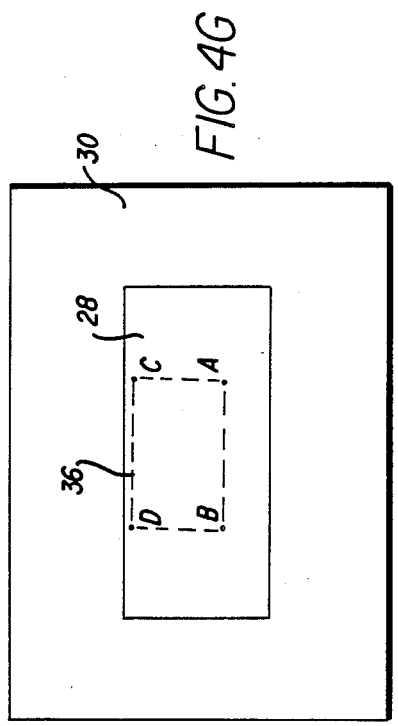
Figure 4H:
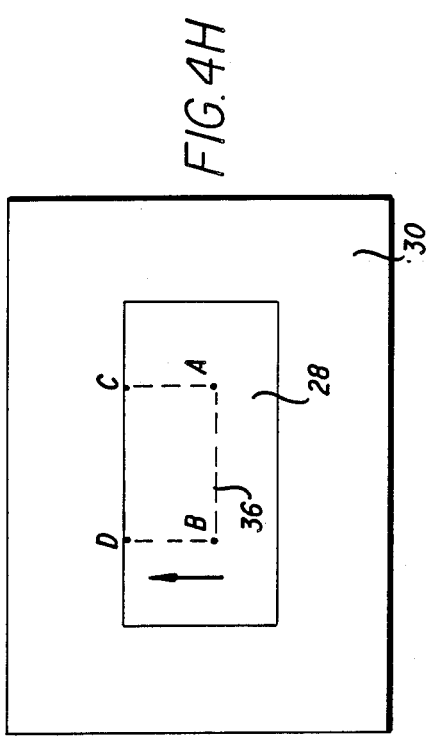

Gross vertical alignment is accomplished then by moving the sensor up until corner pixel C goes dark (FIG. 4H), and by moving the sensor down and counting the number of steps until corner pixel A goes dark (FIG. 4I). The resulting count is divided by two and the sensor is moved back up by an amount equal to the divided count (FIG. 4J) to an approximately aligned position.

Having briefly discussed the sensor alignment procedure, a broad description of the present exemplary embodiment will be continued. It should be appreciated that prior to the aforementioned alignment procedure, it is necessary first to center the sensor so that at least three corner pixels are illuminated by the light source (light). This is accomplished by returning to the initial determination of whether at least one corner pixel is light (decision block 72 of FIG. 3A). A true answer to this condition results in the sensor being moved as necessary until at least three of the four corner pixels are light as indicated in flowblock 74. This centering procedure will be explained in greater detail later on. Once at least three corner pixels are illuminated, the aforementioned very gross X axis alignment, the aforementioned gross rotational alignment, and the aforementioned gross Y axis alignment are accomplished (flowblocks 76 through 86). Then when the sides of the sensor are approximately parallel to the mask opening edges, another more accurate alignment (flowblocks 88, 90) is accomplished in the same manner as discussed with reference to flowblocks 76, 78.

Continuing with a discussion of the overview flowchart, once gross alignment of the sensor has been completed the slave microprocessors have their position registers initialized to zero (flowblock 92) to indicate an aligned location. Then the magnification of the lens is calculated (flowblock 94) by the formula:

Magnification = Image Size/Object Size. This in turn equals the dimension (in stepper motor steps) of the sensor along the X axis, divided by (the dimension of the mask opening along the X axis minus the aforementioned dimension h). This magnification value then is sent to initialize the zoom motor slave microprocessor (flowblock 96).

During the aforementioned gross alignment procedure, the optics of the film video player may be out of focus. Therefore to ensure optimum alignment, the optics system are focused on a mask opening edge (flowblock 98) in the following manner:

After the gross alignment procedure described above has been accomplished, the arrowhead 23 of FIG. 2 is pointed roughly at the center of the mask 30. Then, the sensor 36 and the lens 34 are moved to the "left" (with respect to the orientation of the apparatus in FIG. 2) until the arrowhead 23 points at the edge of the "lefthand" edge of the mask 30 lying between the points A' and C'. Next, under control of the processor 62, the distance between the sensor 36 and the lens 34 as well as the distance between the lens 34 and the plane of the mask 30 are both varied on an iterative trial-by-error basis until the processor 62 senses that the image of the "lefthand" edge (between the points A' and C') obtains a maximum sharpness.

Having completed gross alignment and focusing operations, a fine alignment procedure (flowblocks 100, 102) along the X, Y, and Z axes is instituted by repeating the steps of flowblocks 76 through 84. When this is completed, the slave processors for the scan/rotate motors 53, 54, the sensor motor 58, and scan motor 48 are again initialized to zero (flowblock 104). Furthermore, the magnification is recalculated and the result is used to reinitialize the slave processor for the zoom motor. In addition, the distance between the mask 30 and the film plane 24 is used to focus the optics on the film plane (flowblock 108) in preparation for displaying the first film image.

Having provided a broad overview of the present invention, attention will now be turned to its details. As discussed briefly, the procedure begins by locating and identifying the corner pixels which are output from the sensor. In an exemplary embodiment, the sensor is an interline transfer charge coupled array whose operation for generating a video display is described in greater detail in U.S. application Ser. No. 07/143,110 entitled "Video Timing System Which Has Signal Delay Compensation And Which Is Responsive To External Synchronization", filed Jan. 11, 1988 and assigned to the assignee of the present invention; the contents of which are incorporated herein by reference.

In the present embodiment, a pulse (CORNPIX) is generated at approximately two scan lines after the end of the vertical blanking interval when the first active pixels of that line are output from the sensor. The signal CORNPIX is generated by a logic gate in a timing circuit 114 (FIG. 5), and it signals the output of the corner pixel A from the sensor. On the same scan line at a location about four pixels from the last active pixel of that line, another active output (CORNPIX) is generated from another logic gate in the timing circuit to signal the presence of corner pixel B. Similarly, at about two scan lines before the start of another vertical blanking interval and about four pixels after receipt of the first active pixel, another logic gate generates an active output to signal the presence of corner pixel C. Furthermore on the same line at a location about four pixels before the last active pixel, another logic gate generates an active output CORNPIX to signal the presence of corner pixel D. These signals are generated during every field of video output.

In the present embodiment, the image signals from the sensor 36 are fed to an anolog-to-digital convertor 116 (FIG. 5). The most significant bit (MSB) at the output of ADC 116 is stripped off and fed to an accumulator 118 which includes a shift register 119 having a corner pixel A bit location 120, which is preceded by bit locations 122, 124, 126 for corner pixels B, C, and D respectively. Upon generation of a CORNPIX pulse, the shift register is clocked serially so that at the end of every field the shift register contains the most significant bits of the four corner pixels A, B, C and D.

In a further exemplary embodiment, two adjacent pixels at each corner location are grabbed to provide some redundancy in the event that one or more of the pixels is defective. If a corner pixel is identified in the aforementioned manner as being defective, the remaining adjacent corner pixel is selected for use in aligning the sensor.

Figure 3B:
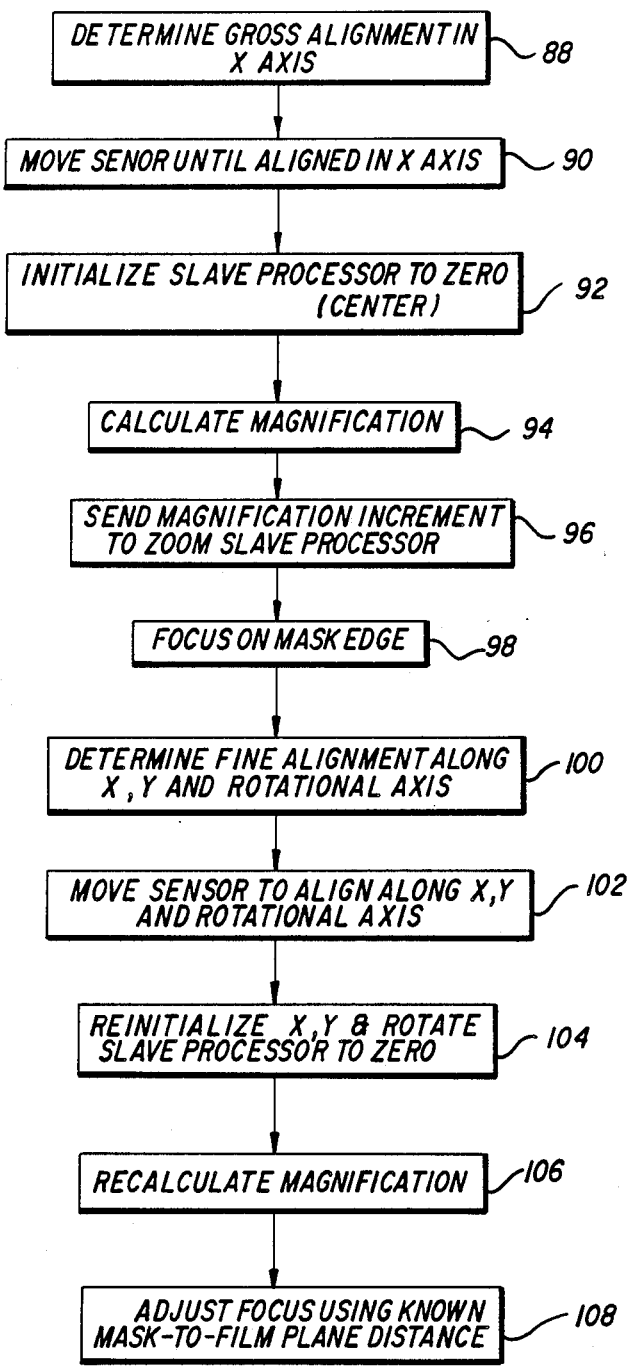
Figure 6:
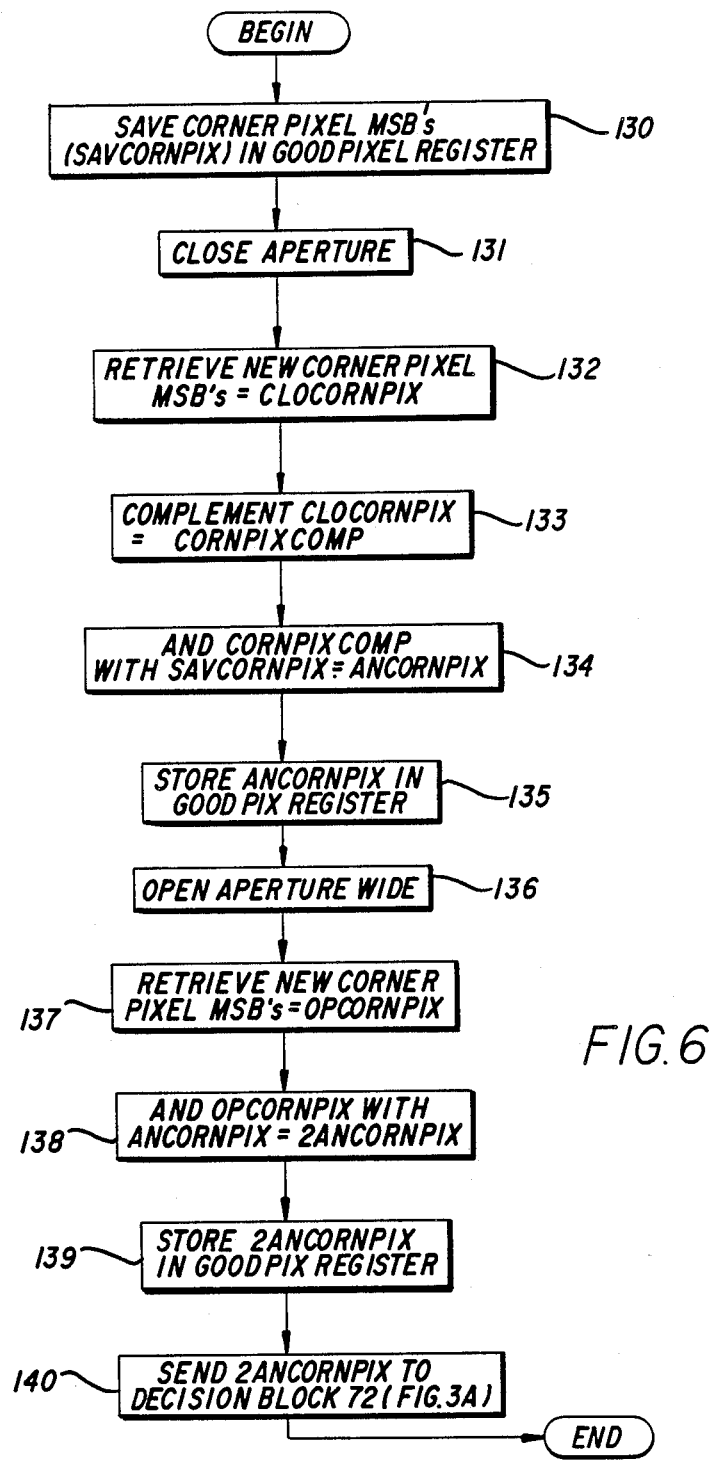
FIG. 6 is a flowchart to identify defective corner pixels of the sensor.

In an exemplary embodiment which is flowcharted in FIG. 6, a test is made for any defective corner pixels prior to decision block 72 (FIG. 3A). More specifically, the data in the shift register 119 (FIG. 5) is saved (SAVCORNPIX) into another register called "GOODPIX" (not shown). Then the aperture 40 (FIG. 1) is closed to prevent any light from reaching the sensor (flowblock 131), and the register 119 is filled with another field of corner pixel MSB's (CLOCORNPIX in flowblock 132) which is saved in another register. The CLOCORNPIX data is complemented (CORNPIXCOMP) and logically ANDed with the SAVCORNPIX data (flowblocks 133, 134). The resulting ANCORNPIX data replaces the data in the GOODPIX register (flowblock 135).

The purpose of this operation is shown by way of example in FIG. 7 where corner pixel B is indicated as a constantly defective pixel. That is, regardless of whether the aperture 40 is open or closed, this pixel B is light. Pixel B shows up as a defective pixel (value=0) in the ANCORNPIX data which is put into the GOODPIX register.

In the present example charted in FIG. 7, corner pixel C is also bad, however only inconsistently bad. That is, when the aperture is first closed, corner pixel C goes dark indicating proper operation. However, when the aperture is reopened (flowblock 136 in FIG. 6) pixel C remains dark. This is detected after the aperture 40 is reopened, and another field of corner pixels (OPCORNPIX in flowblock 137) is stripped off into a register, and this MSB pixel data is logically ANDed with the previously ANDed data (ANCORNPIX in flowblock 138). The resulting ANDed data (2ANCORNPIX in flowblock 138) is stored in the GOODPIX register (flowblock 139). As shown by the chart in FIG. 7, the data in the GOODPIX register indicates that pixels B and C are defective by the zeros occupying those bit locations.

After the corner pixels have been retrieved by the processor 62, the decision is made at block 72 of FIG. 3A whether or not at least one of the corner pixels is illuminated (MSB=1) or not illuminated (MSB=0) by the light source. If this condition is true, then the sensor is translated and rotated until at least three of the corners pixels are light (flowblock 74). More specifically, this centering operation is accomplished by referring to the detailed flowchart of FIG. 8. If any three of the four corner pixels are in the light as tested by decision blocks 140 through 148, then the alignment procedure commences in accordance with the routines CORN ABC, CORN ABD, CORN ACD or CORN BCD which are flowcharted in FIGS. 19 through 22 to be discussed later.

Figure 8A:
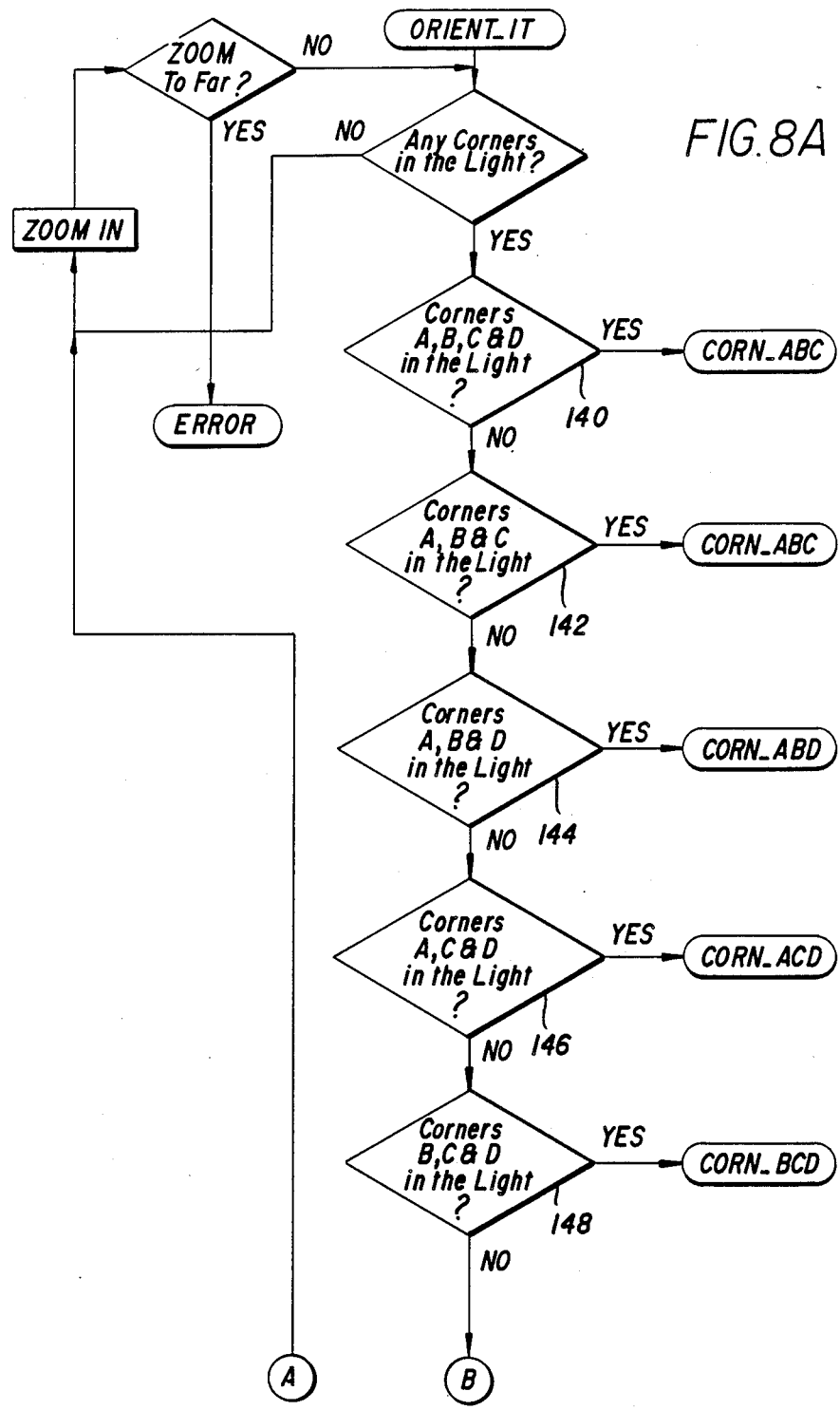
FIGS. 8A-8C is a flowchart for performing a centering operation of the sensor so that at least three of the four corner pixels of the sensor are exposed to the light source through an opening in the mask.
Figure 8B:
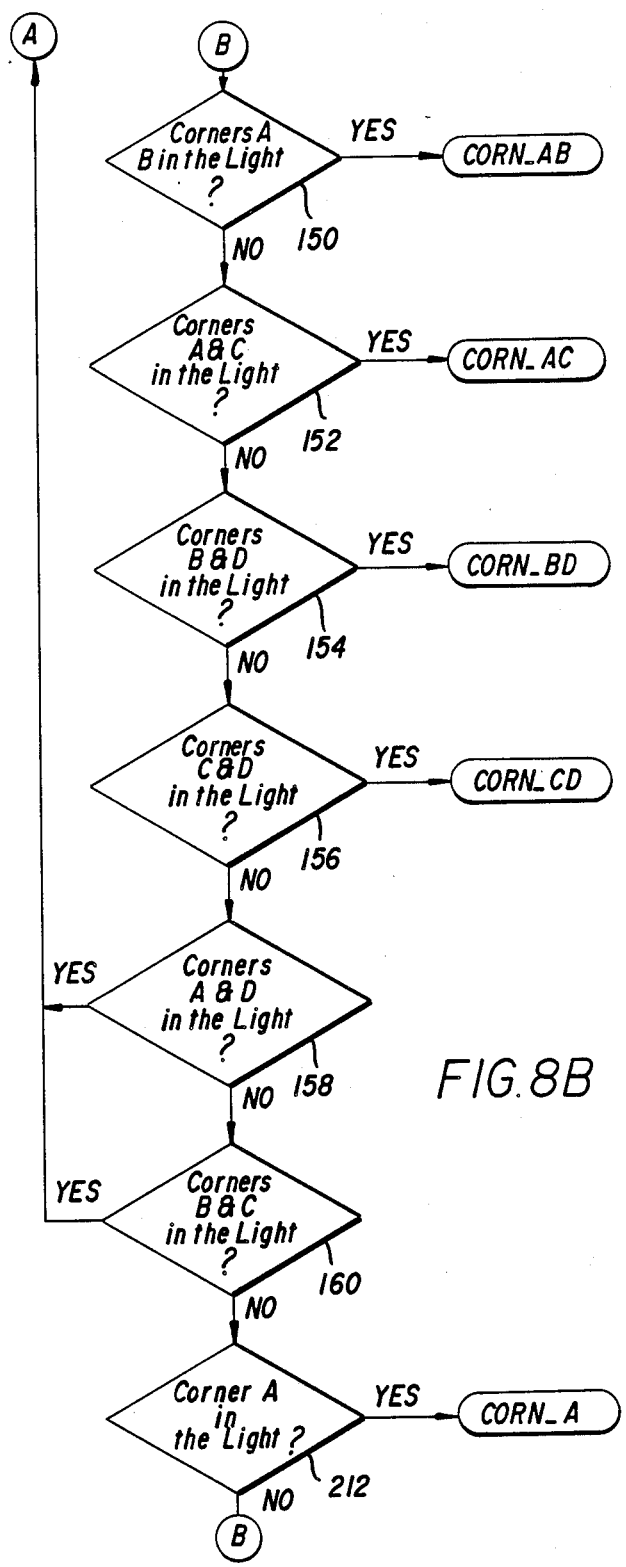
Figure 8C:
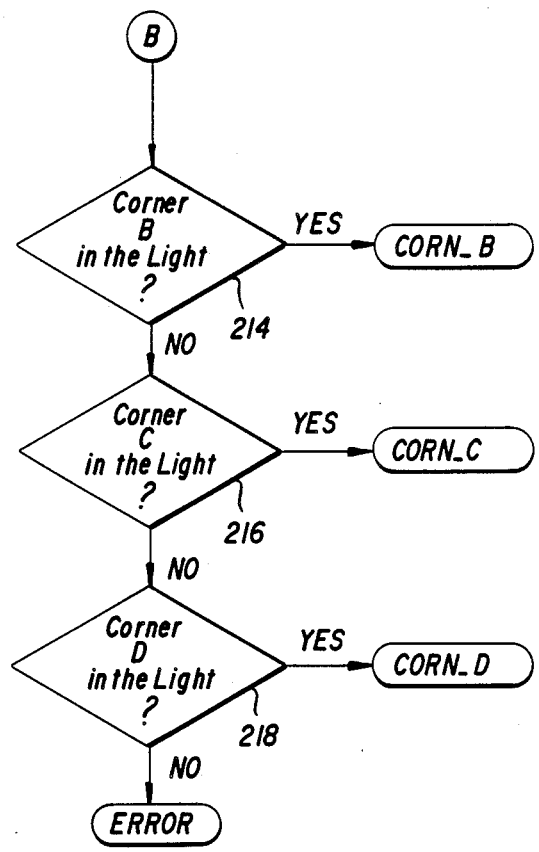
Figure 9A:
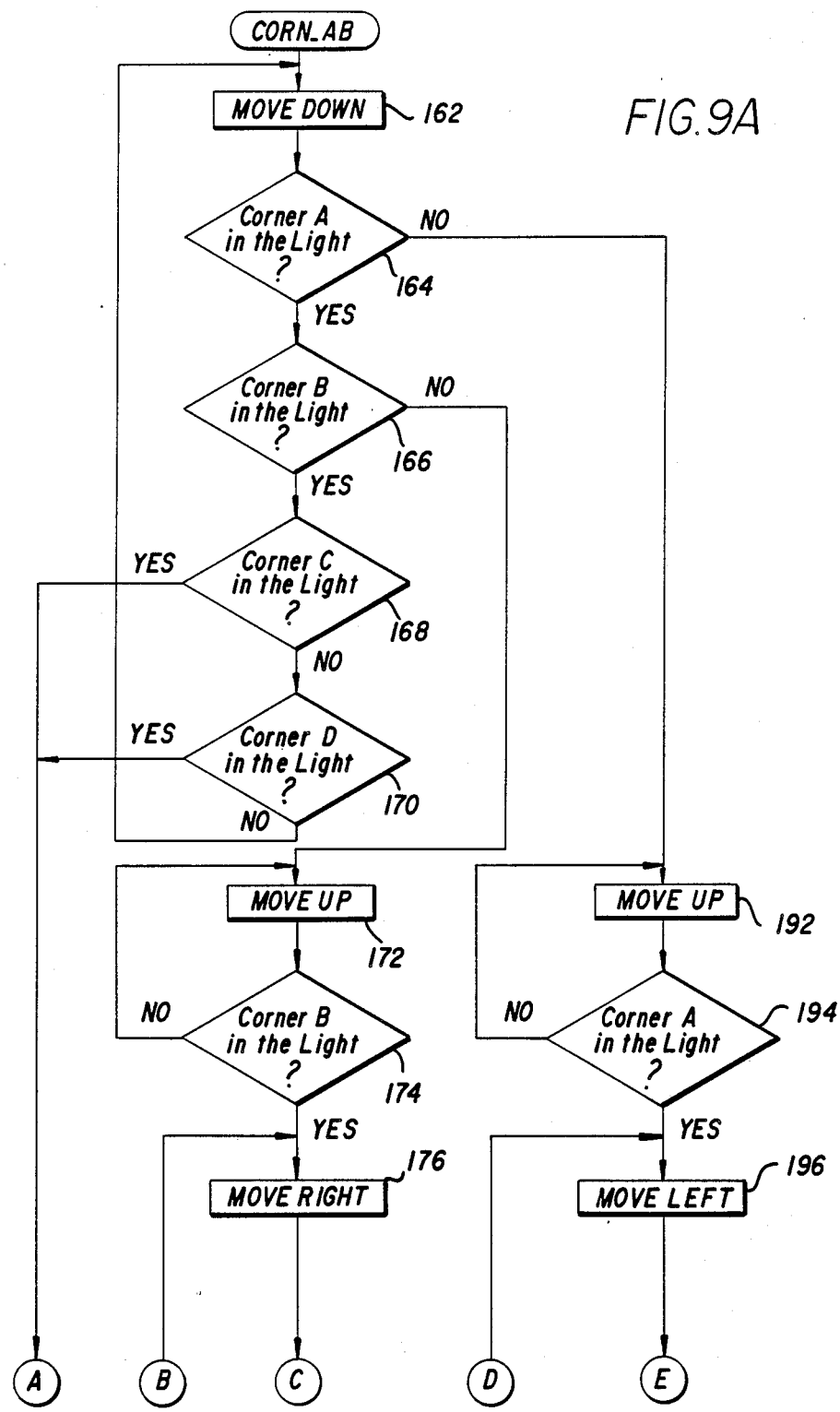
FIGS. 9A through 12C are flowcharts for centering the sensor when only two corner pixels are exposed to the light source so that a third corner pixel can become exposed to the light source.
Figure 9B:
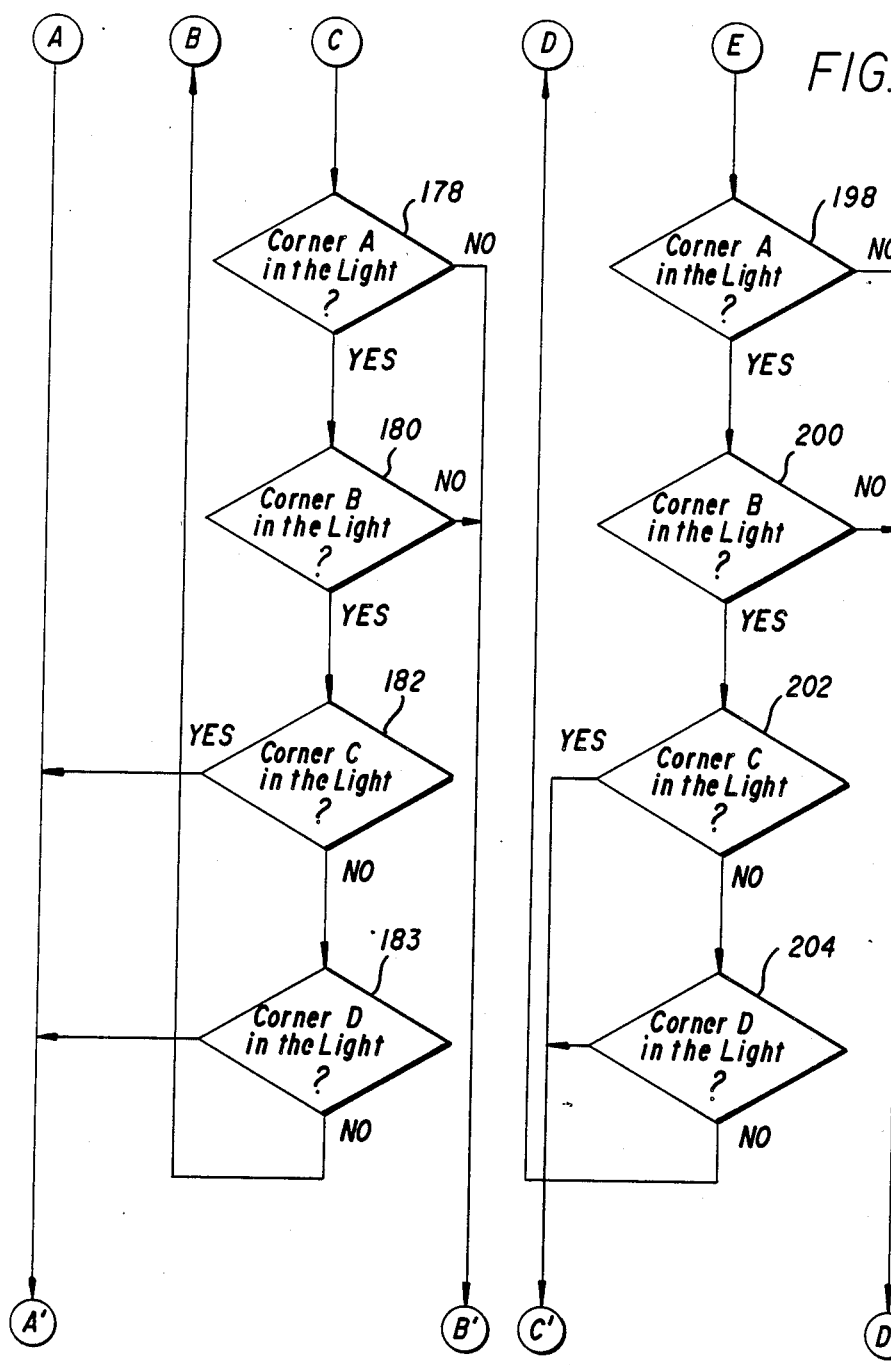
Figure 9C:
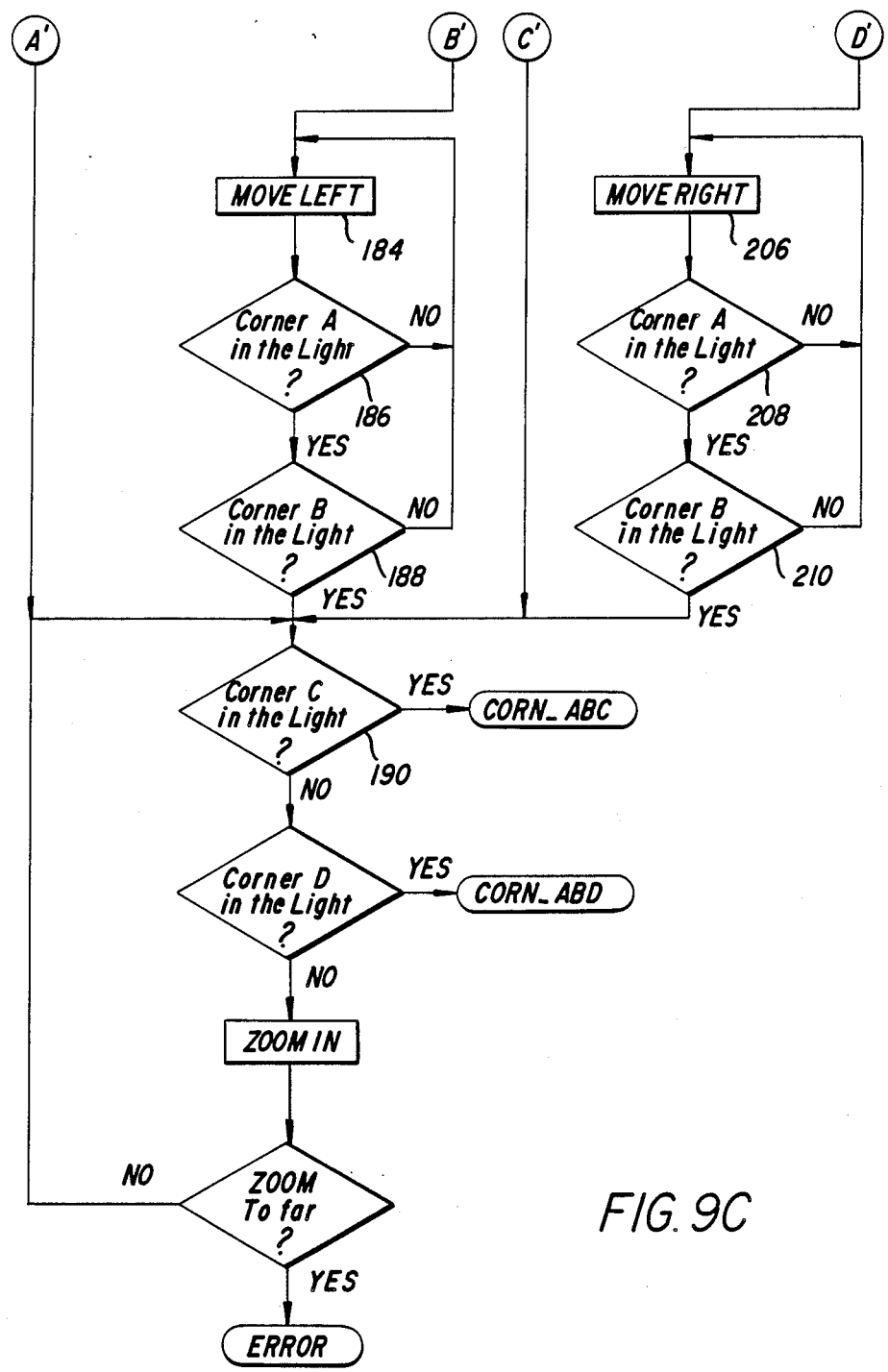
Figure 10A:
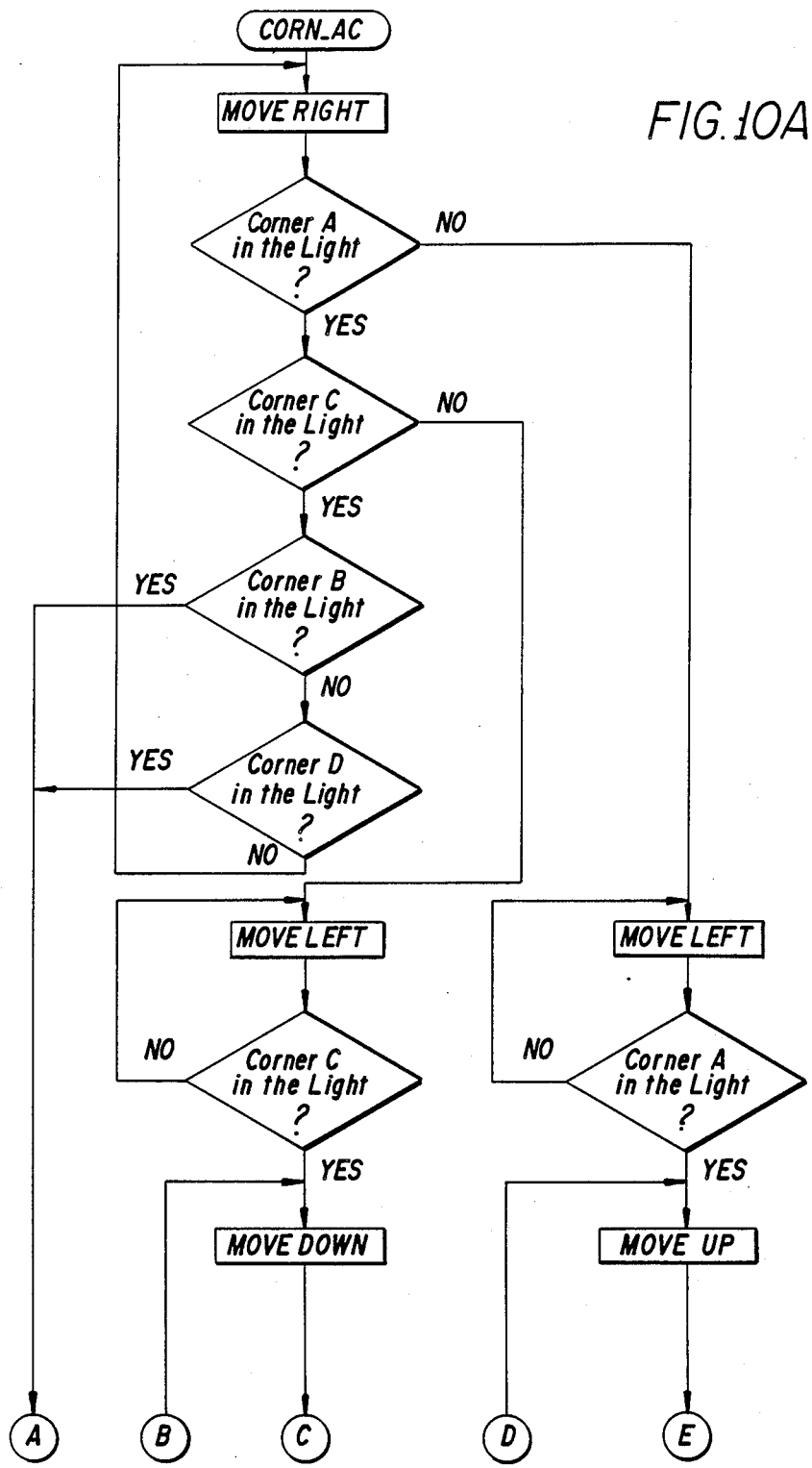
Figure 10B:
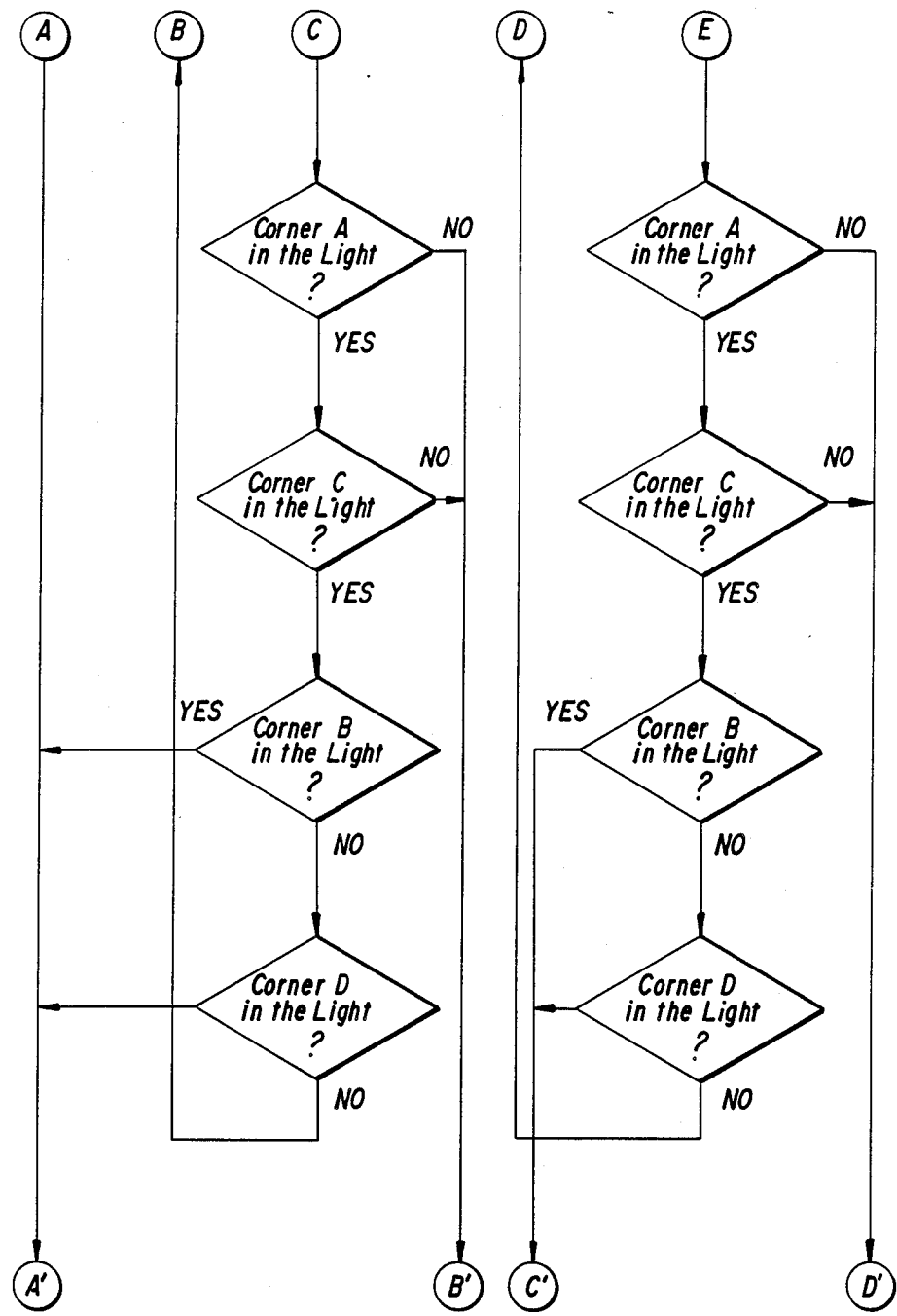
Figure 10C:
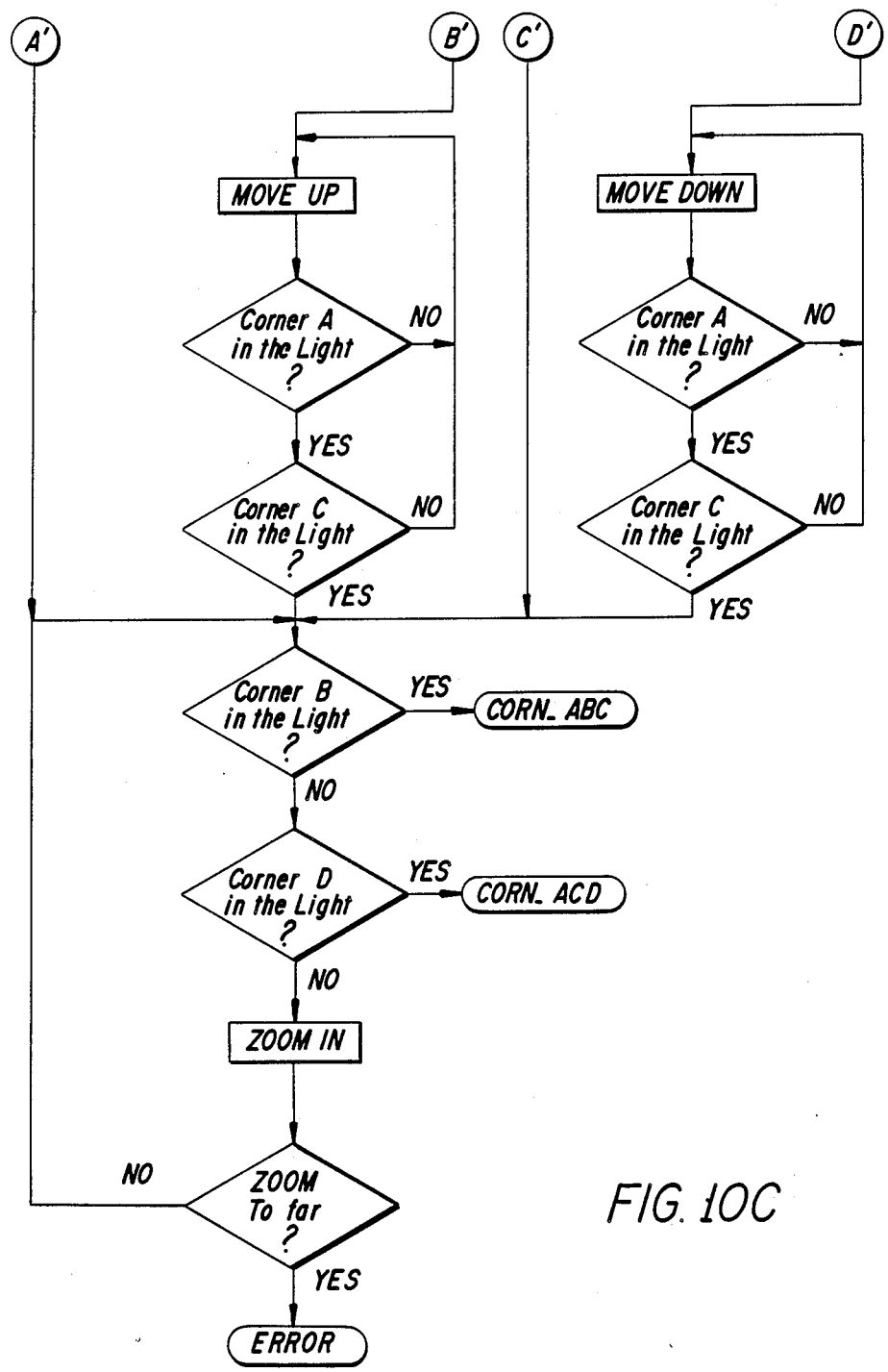
Figure 11A:
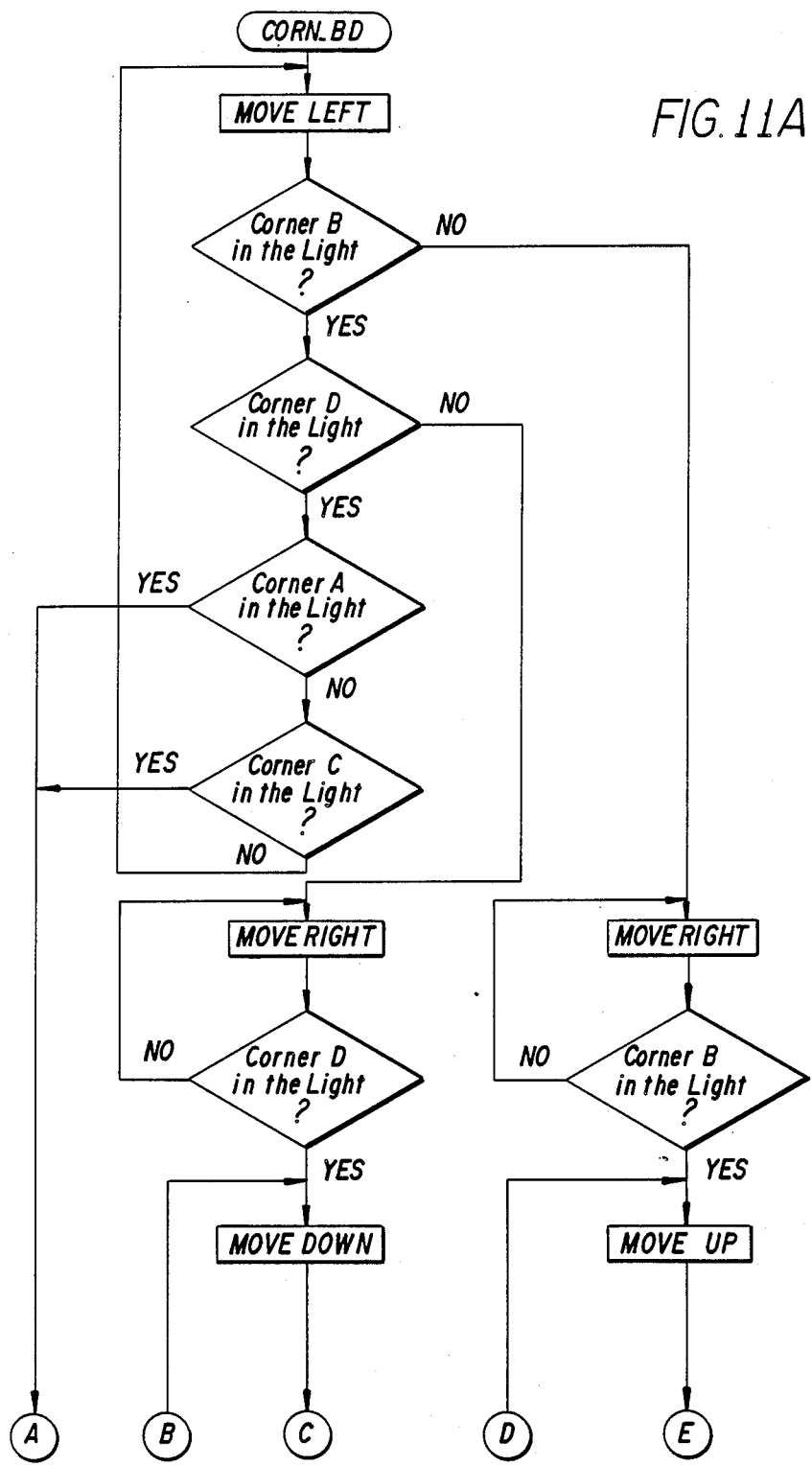
Figure 11B:
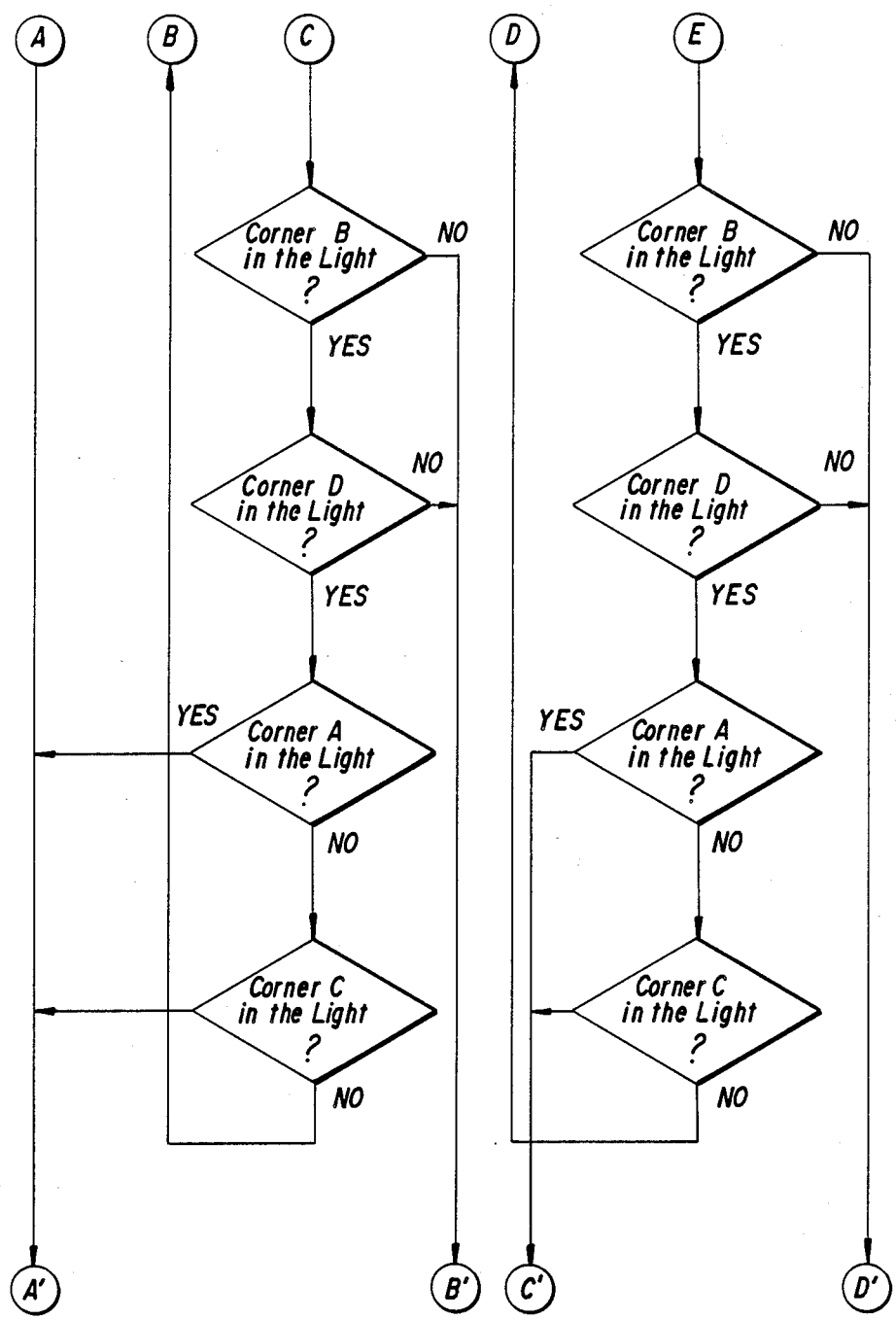
Figure 11C:
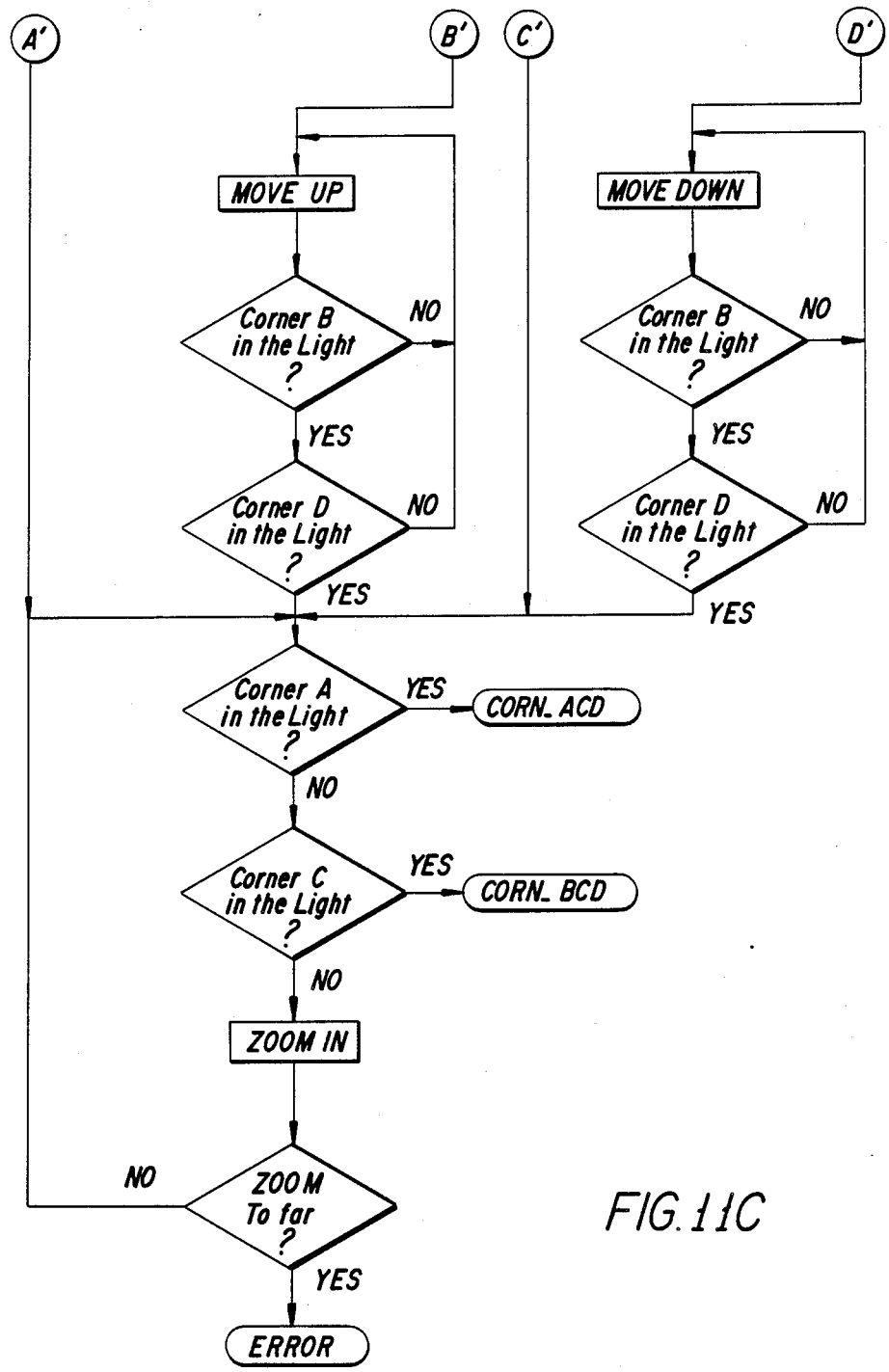
Figure 12A:
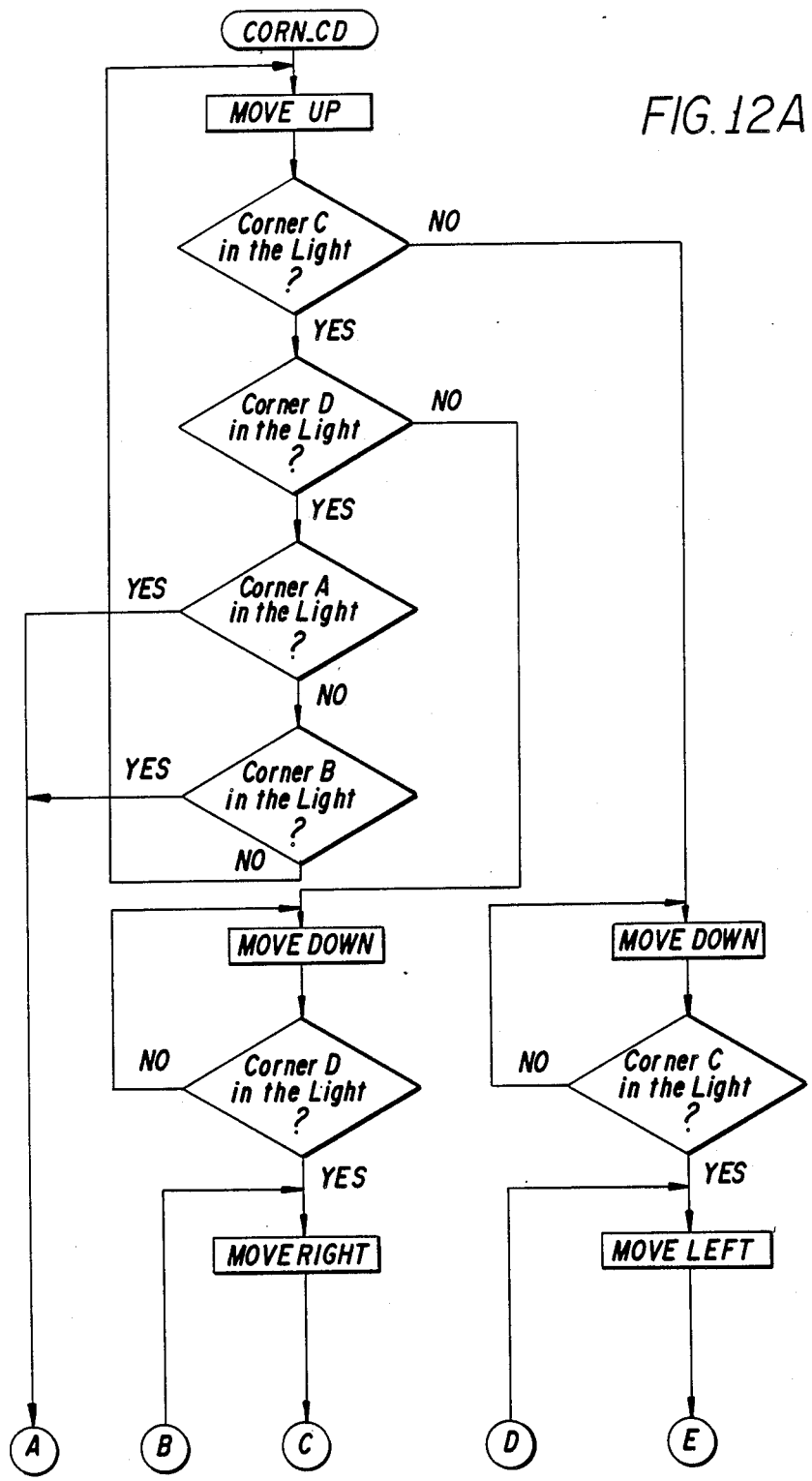
Figure 12B:
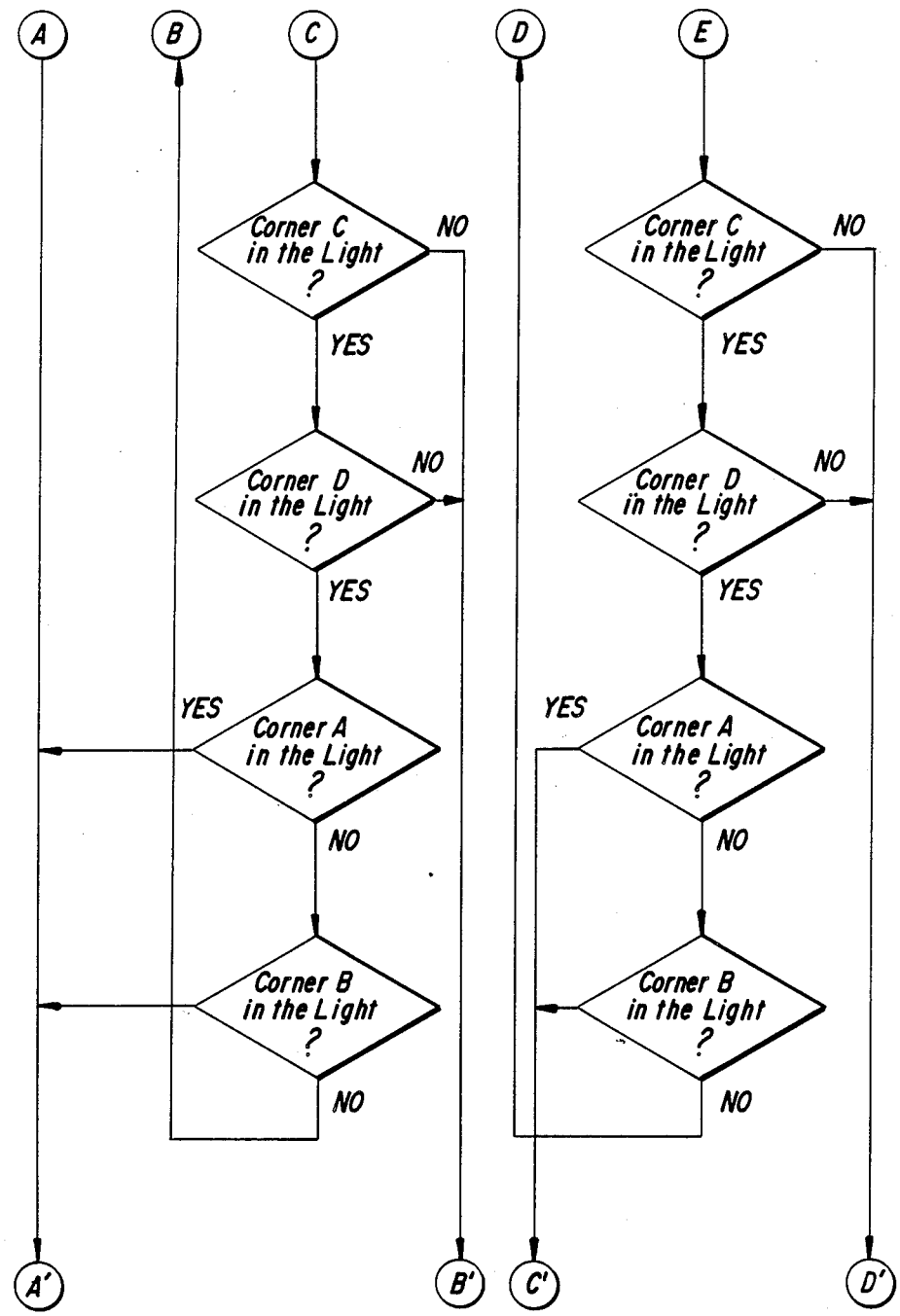
Figure 12C:
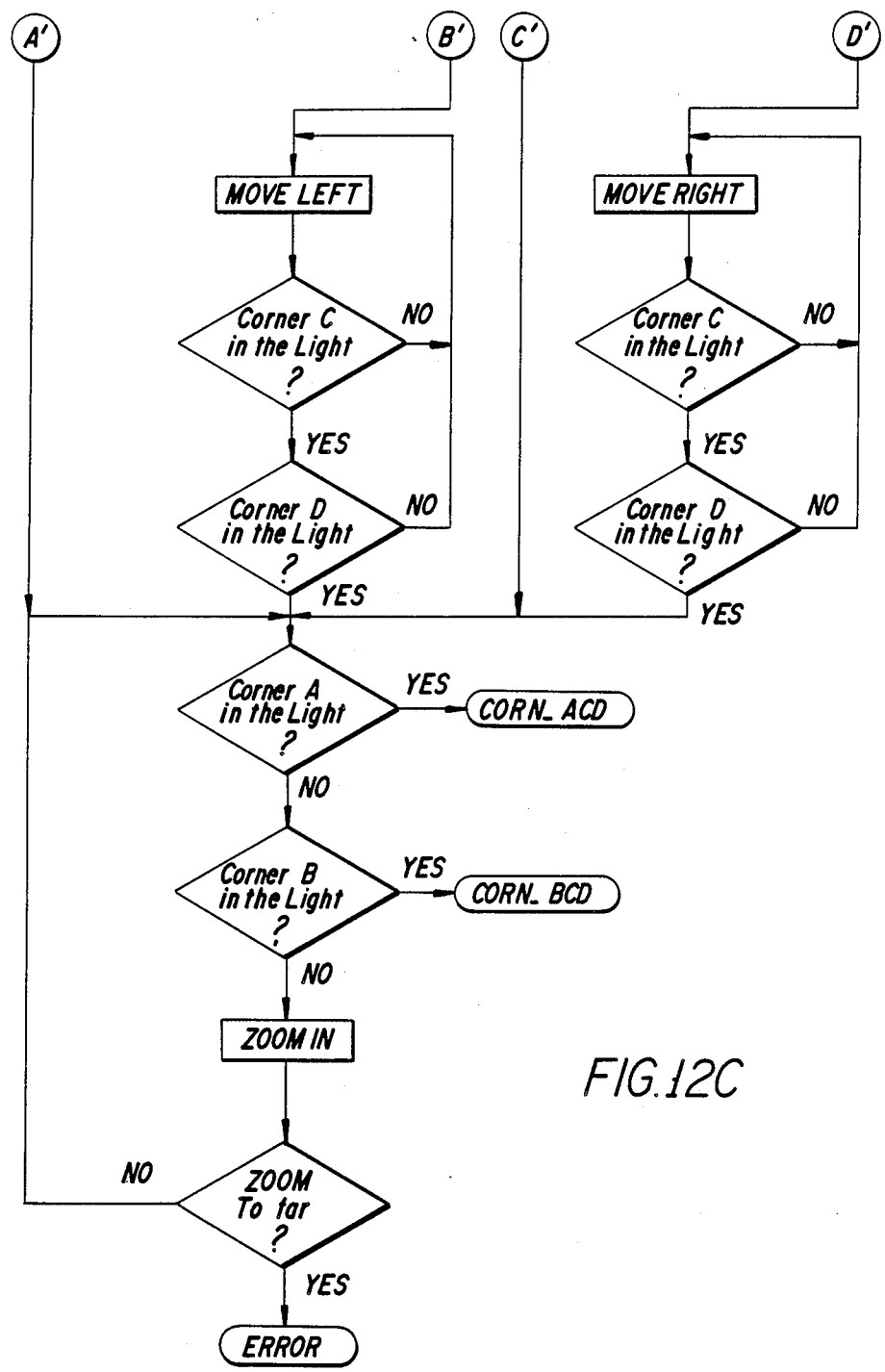
Figure 13A:
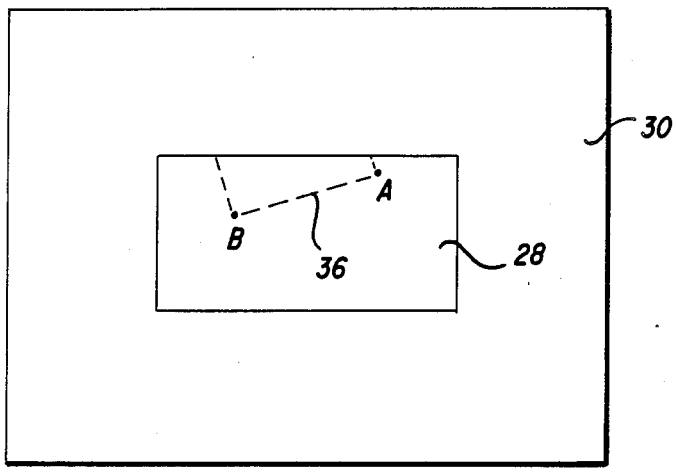
FIGS. 13A and 13B are diagrams illustrating movement of the sensor in accordance with the operating instructions set forth in the flowchart of FIG. 12.
Figure 13B:
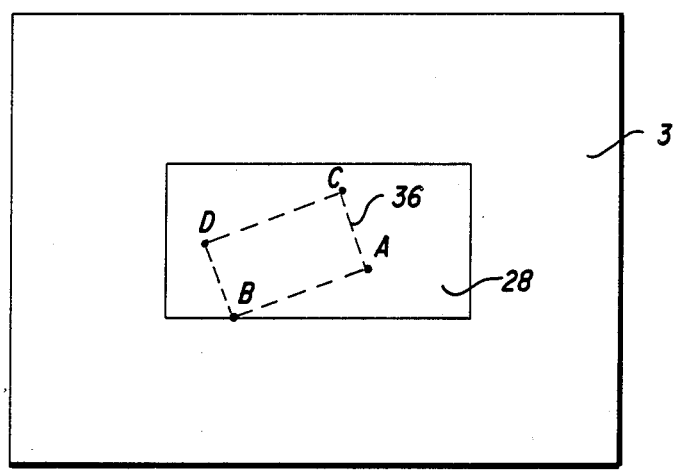

However if only two corner pixels are light, then the sensor must be repositioned to place at least one additional corner pixel in the light as reflected by the tests of decision blocks 150 through 160 (FIG. 8). If the two light corner pixels are diagonally located (corners A and D or corners B and C), then the sensor is zoomed toward the mask (in response to a return loop from decision blocks 158, 160) to locate one additional corner pixel in the light. Otherwise, an additional corner pixel is located in the light via routines CORN AB, CORN AC, CORN BD, or CORN CD flowcharted in FIGS. 9 through 12. These routines operate to move the sensor in a trial and error fashion (by the aforementioned detected transition of a located corner pixel between light and dark) until at least three of the corner pixels are in the light. Since these routines operate in similar manners, only the CORN AB routine (FIG. 9) will be discussed here. The routine CORN AB is accessed when the corner pixels A and B are determined by the processor 62 to be in the light as shown in FIG. 13A. Since the pixels A, B are light, the sensor is moved down (flowblock 162) and the four corner pixels are tested at flowblocks 164 through 170. In the present example, when corner pixel B goes dark (FIG. 13B and flowblock 166) the sensor is moved back up until corner pixel B is light again (flowblock 174).

In the present example the vertical centering results in four corner pixels being light. However, in the event there are only two light corner pixels, centering along the X axis is achieved by flowblocks 176 through 188 (FIG. 8).

Figure 14:
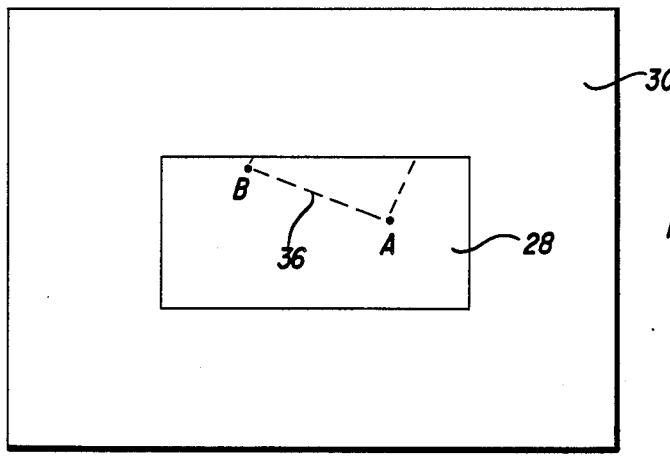
FIG. 14 is a diagram illustrating a position of the sensor which is centered in accordance with the instructions set forth in the flowchart of FIG. 12.
Figure 15:
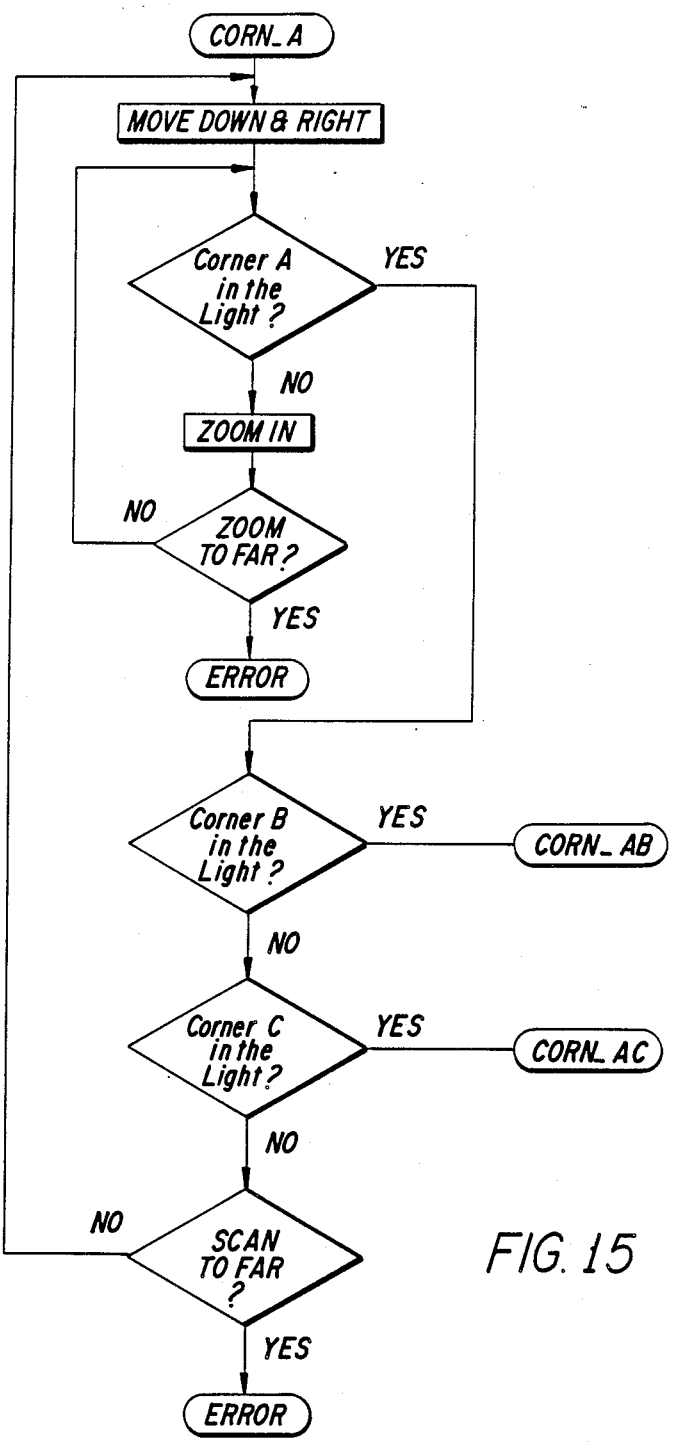
FIGS. 15 through 18 are flowcharts for centering the sensor when only one corner pixel is exposed to the light source so that a second corner pixel can become exposed to the light source.
Figure 16:
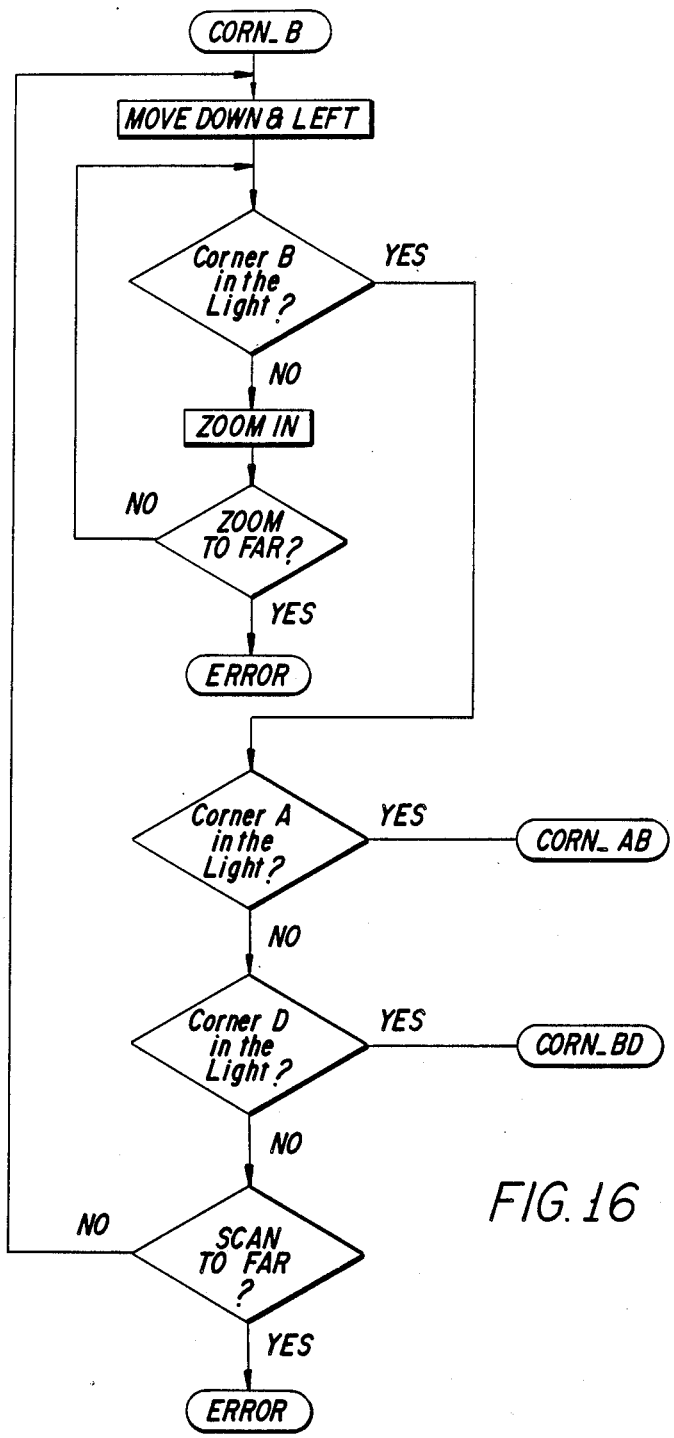
Figure 17:
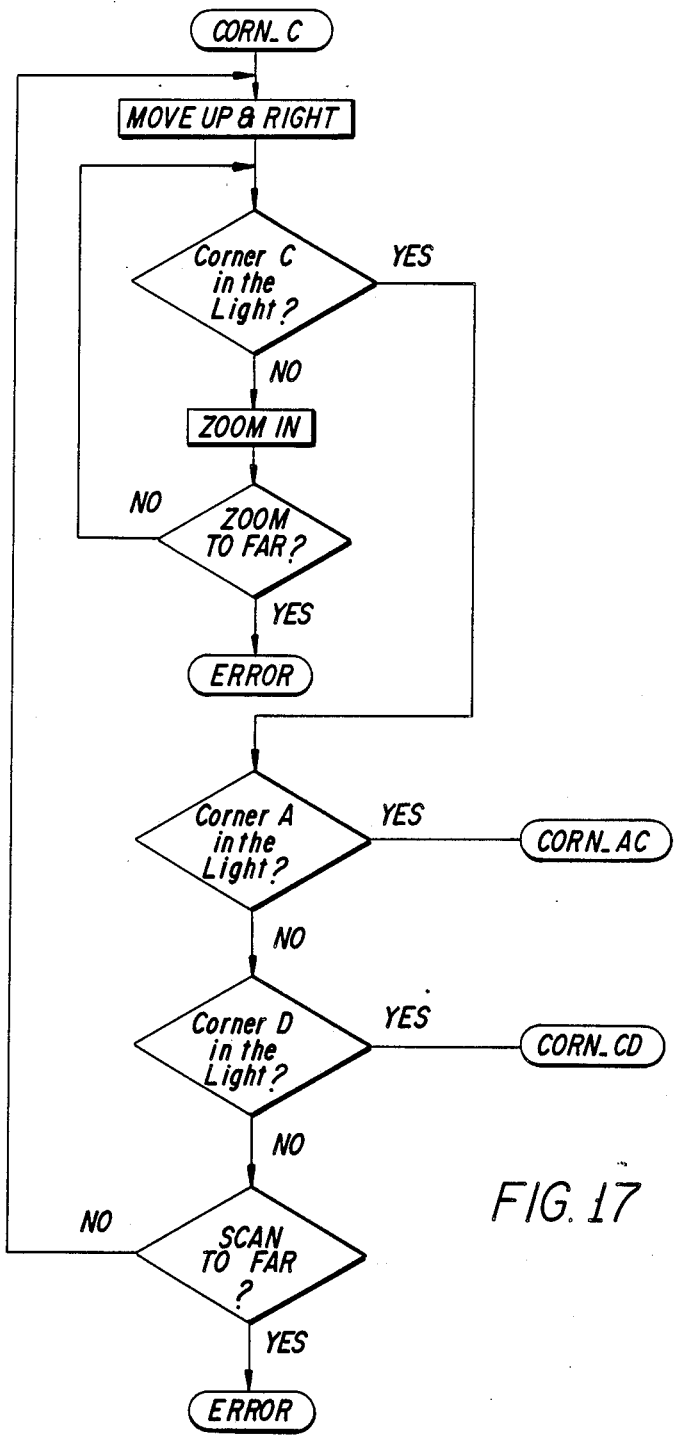
Figure 18:
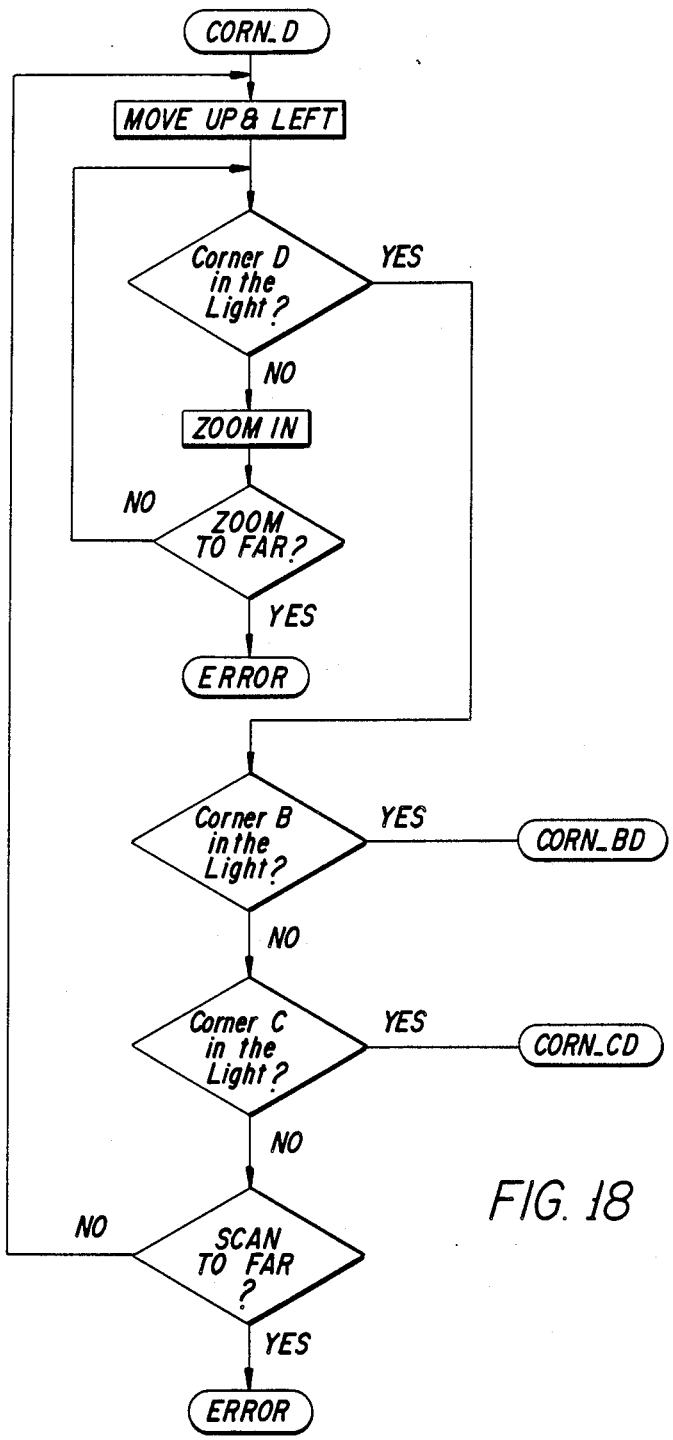
Figure 19:
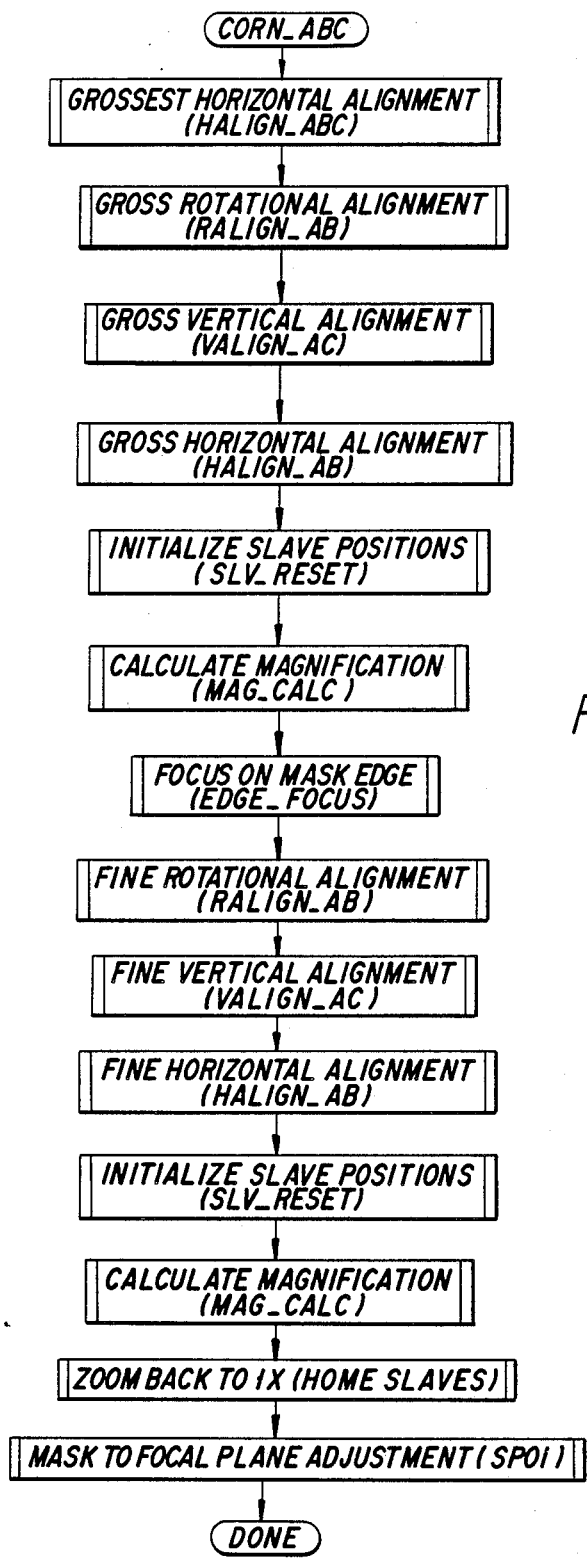
FIGS. 19 through 22 are flowcharts for alignment of the sensor after at least three of the corner pixels have become exposed to the light source.
Figure 20:
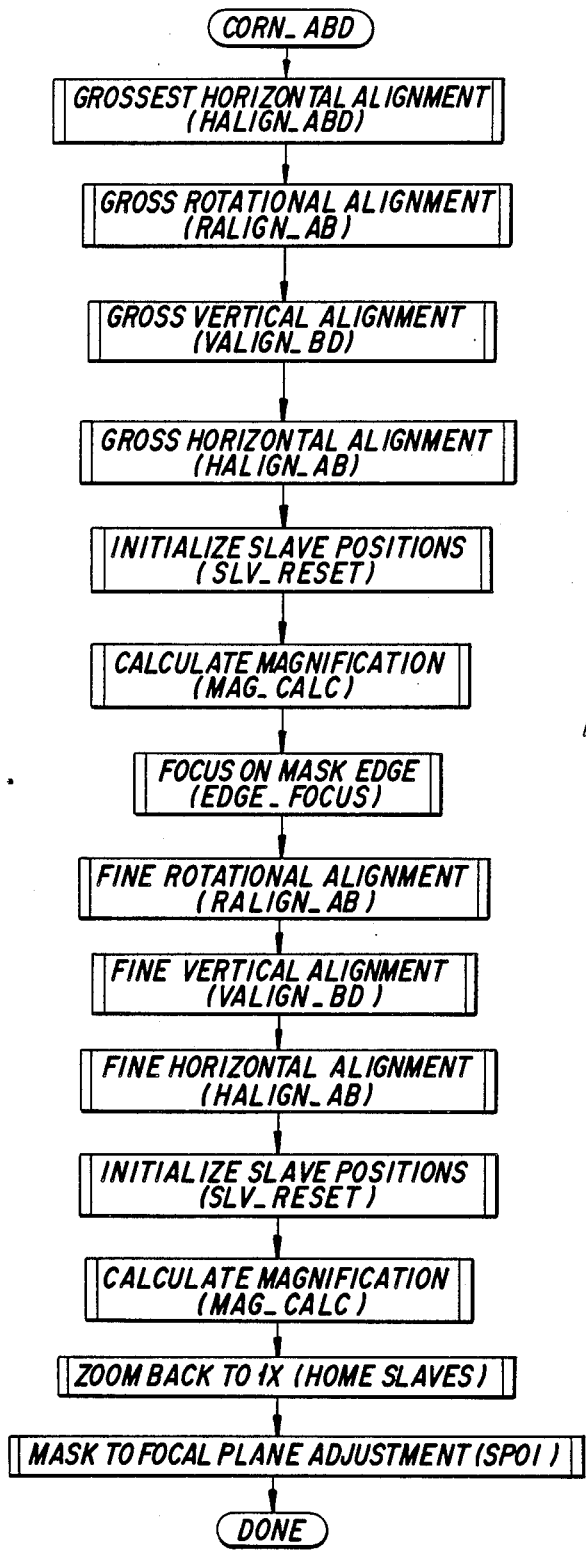
Figure 21:
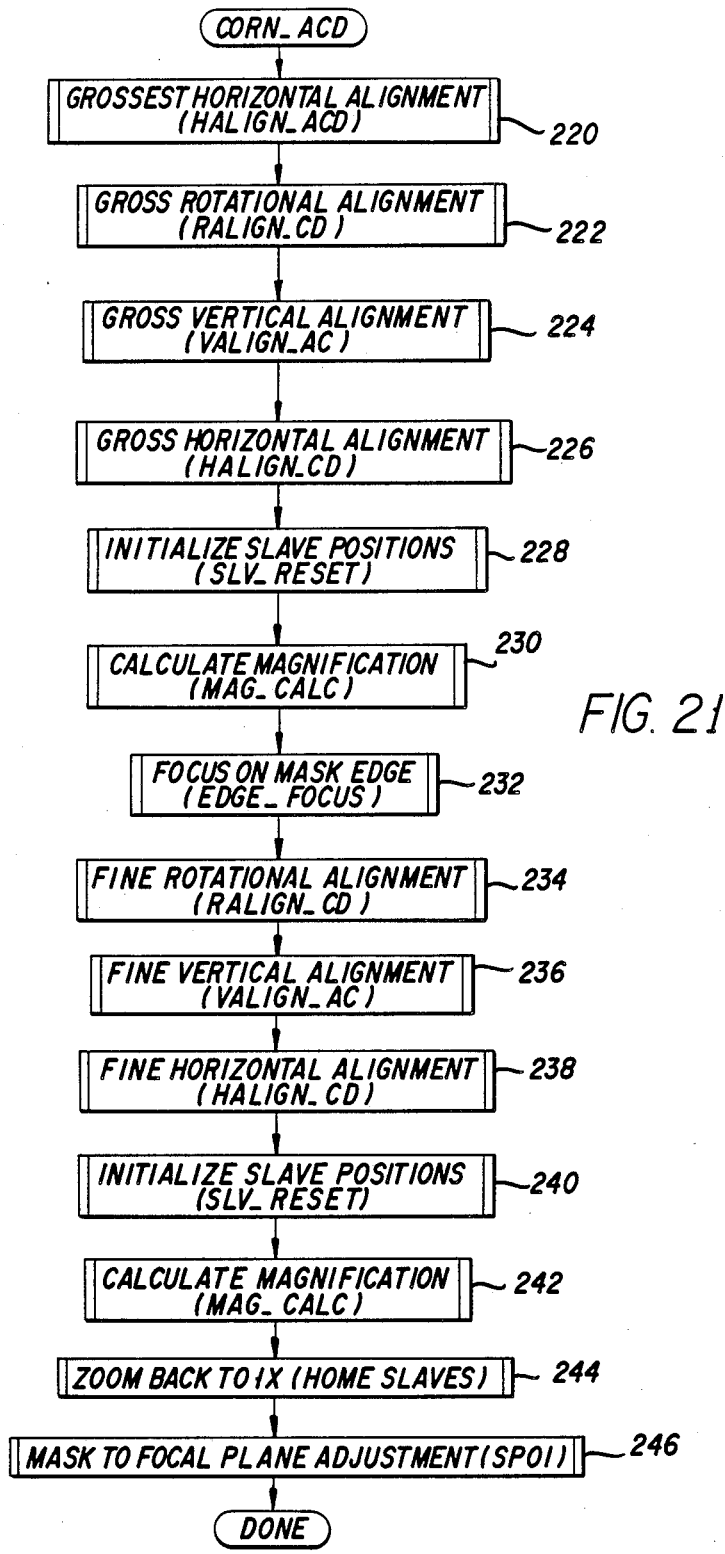
Figure 22:
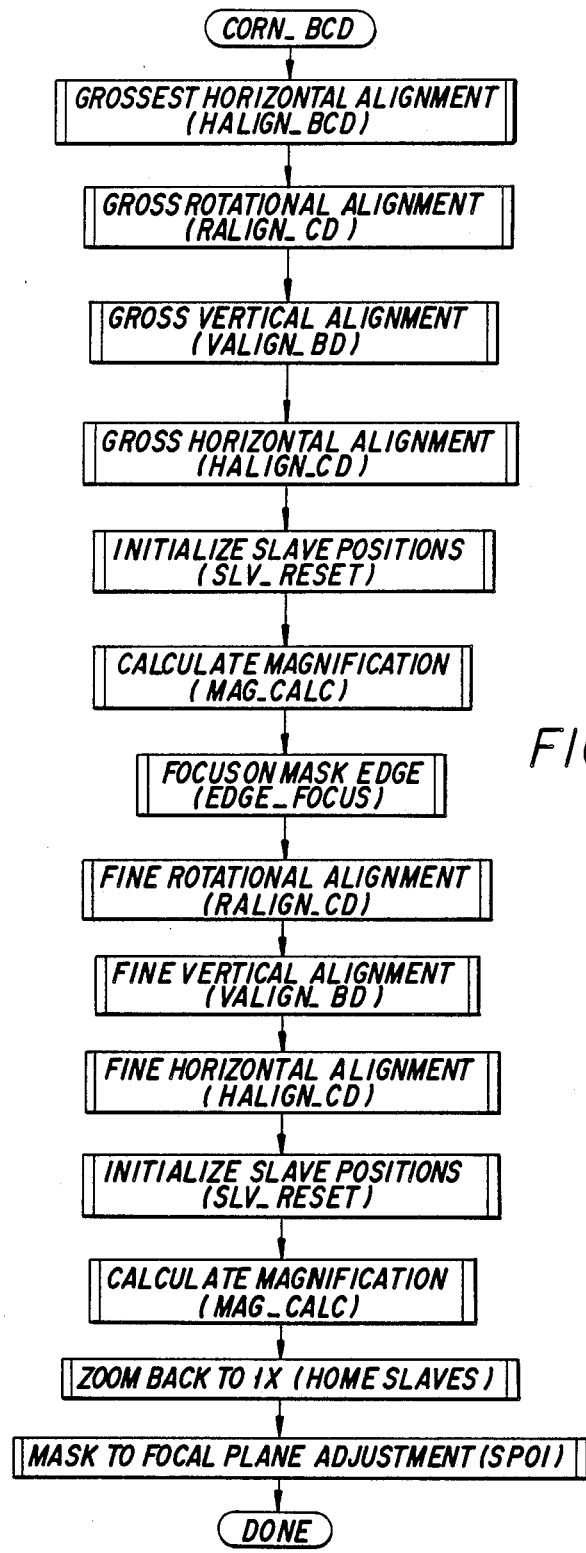

In the present example, however, the tests at decision blocks 178, 180, 182, and 190 are true (corner pixels A, B and C are light), and the routine exits to alignment routine CORN ABC (FIG. 19). In the event the other end of the sensor is tilted upward as shown in FIG. 14, then centering is achieved in accordance with the flowblocks 192 through 210 of FIG. 8. The remaining routines flowcharted in FIGS. 10 through 12 operate in a similar manner and will not be discussed herein.

In the event only one corner pixel is light, then the tests at decision blocks 150 through 160 (FIG. 8) are false, and tests are made at decision blocks 212 through 218. If any of these one pixel conditions are true, then a corresponding subroutine CORN A, CORN B, CORN C, or CORN D is entered. These subroutines operate to reposition the sensor so that one additional corner pixel becomes light. When this is achieved, the subroutine is exited and one of the CORN AC, CORN AB, CORN BD, CORN CD subroutines is entered.

Figure 23:
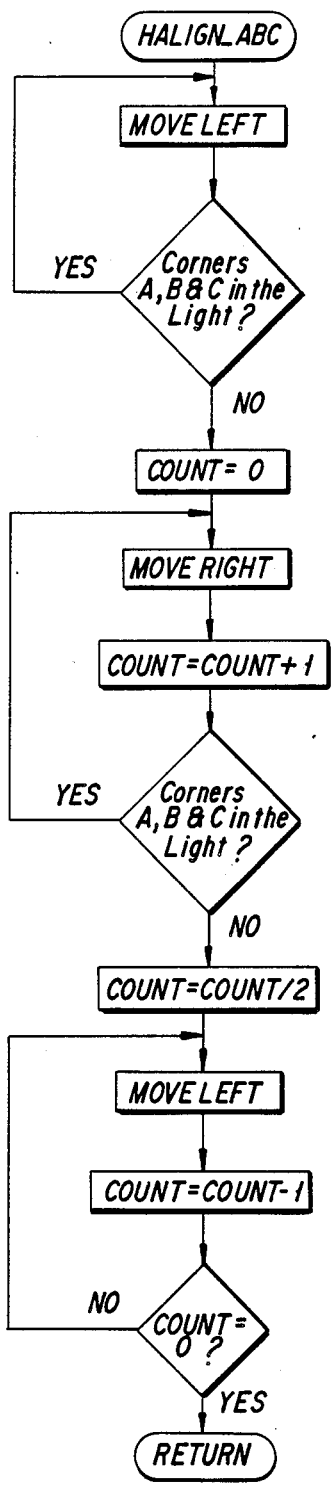
FIGS. 23 through 26 are flowcharts for achieving a very gross alignment of the sensor along an imaginary X axis of the film video player.
Figure 24:
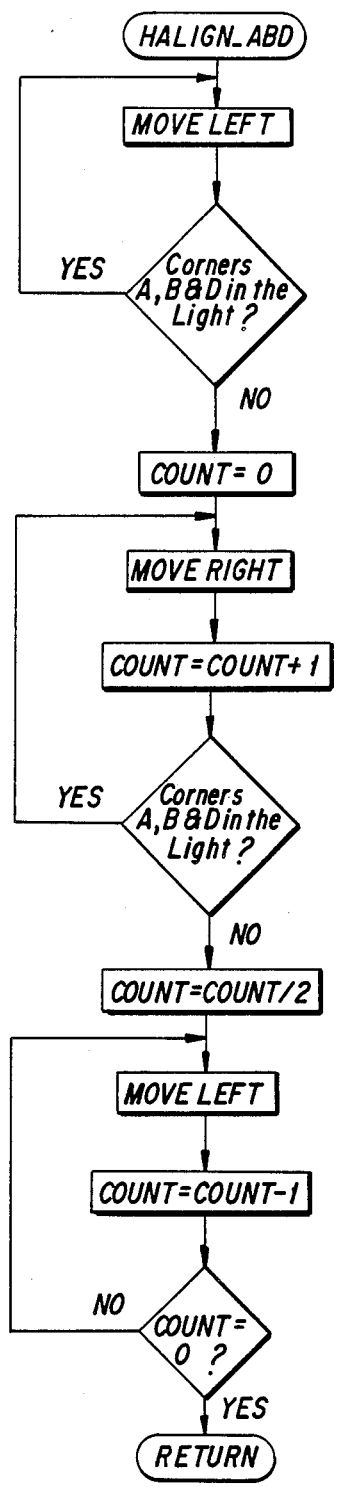
Figure 25:
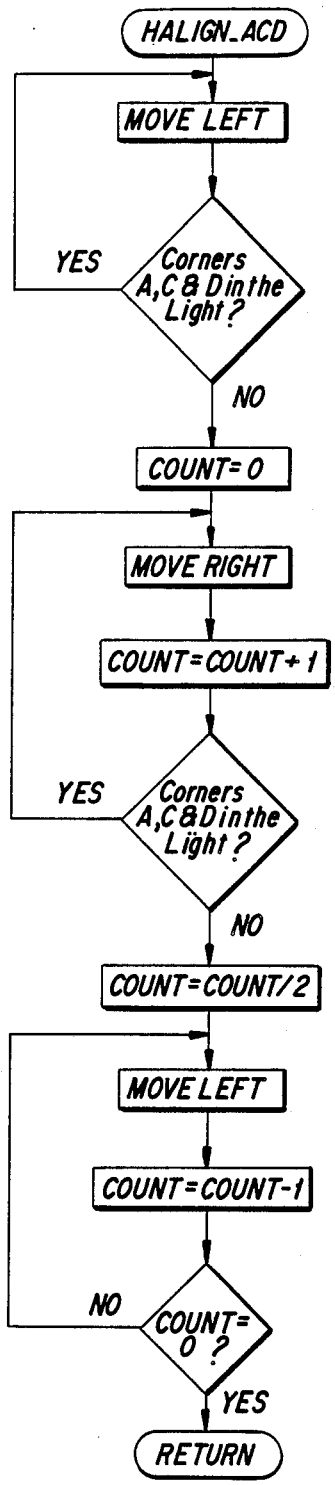
Figure 26:
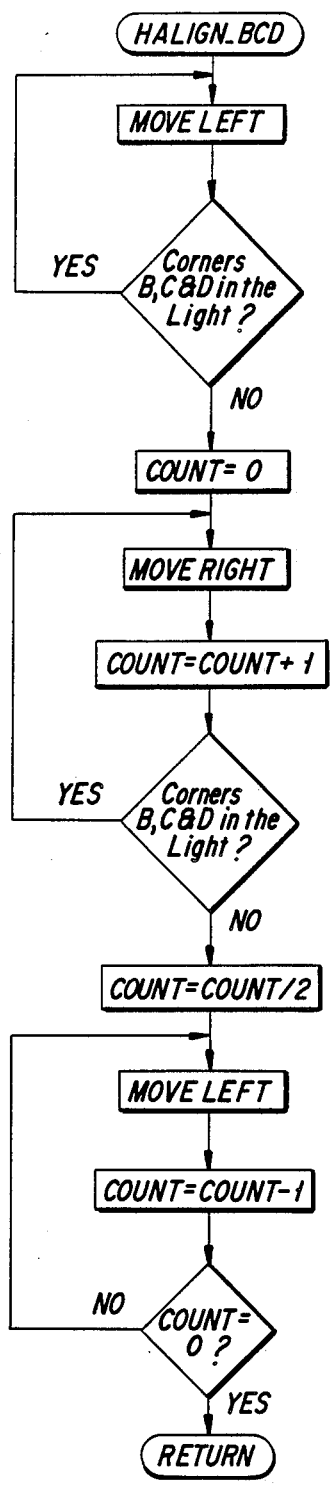

Having centered the sensor so that at least three of the four corner pixels are light, alignment of the sensor is achieved by referring to the alignment routines flowcharted in FIGS. 19 through 22. Since these routines operate in a somewhat similar manner, only the CORN ACD routine (FIG. 21) will be discussed. Initially, the aforementioned very gross horizontal alignment is accomplished (flowblock 220 of FIG. 2) by entering a subroutine HALIGN ACD which is flowcharted in FIG. 25. This routine was described previously with reference to FIGS. 4A through 4D. The other X axis alignment routines (HALIGN ABC of FIG. 23, HALIGN ABD of FIG. 24, and HALIGN BCD of FIG. 26) operate in a similar manner.

Figure 27:
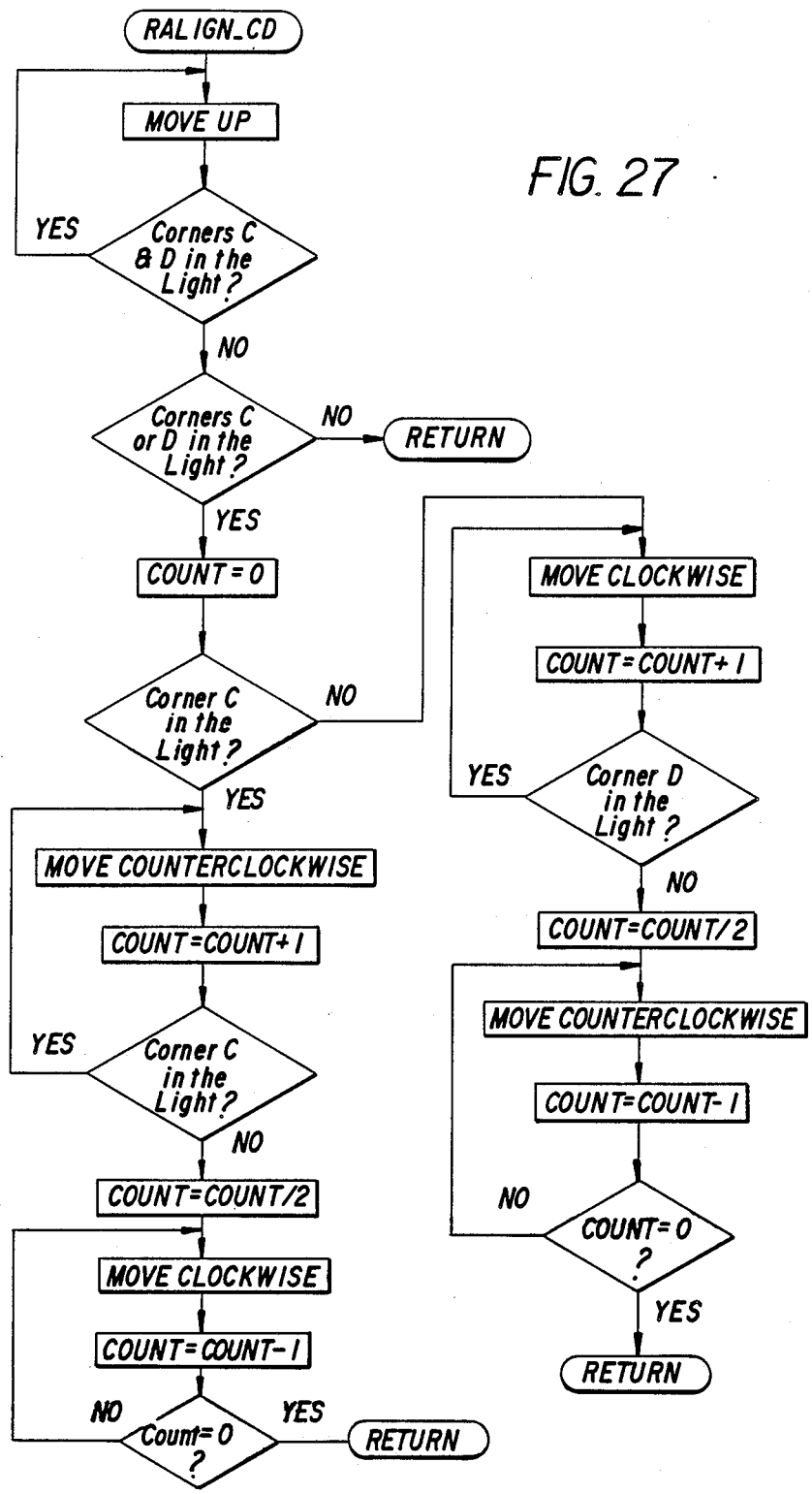
FIGS. 27 and 28 are flowcharts for achieving gross and fine alignment of the sensor about a rotational axis.
Figure 28:
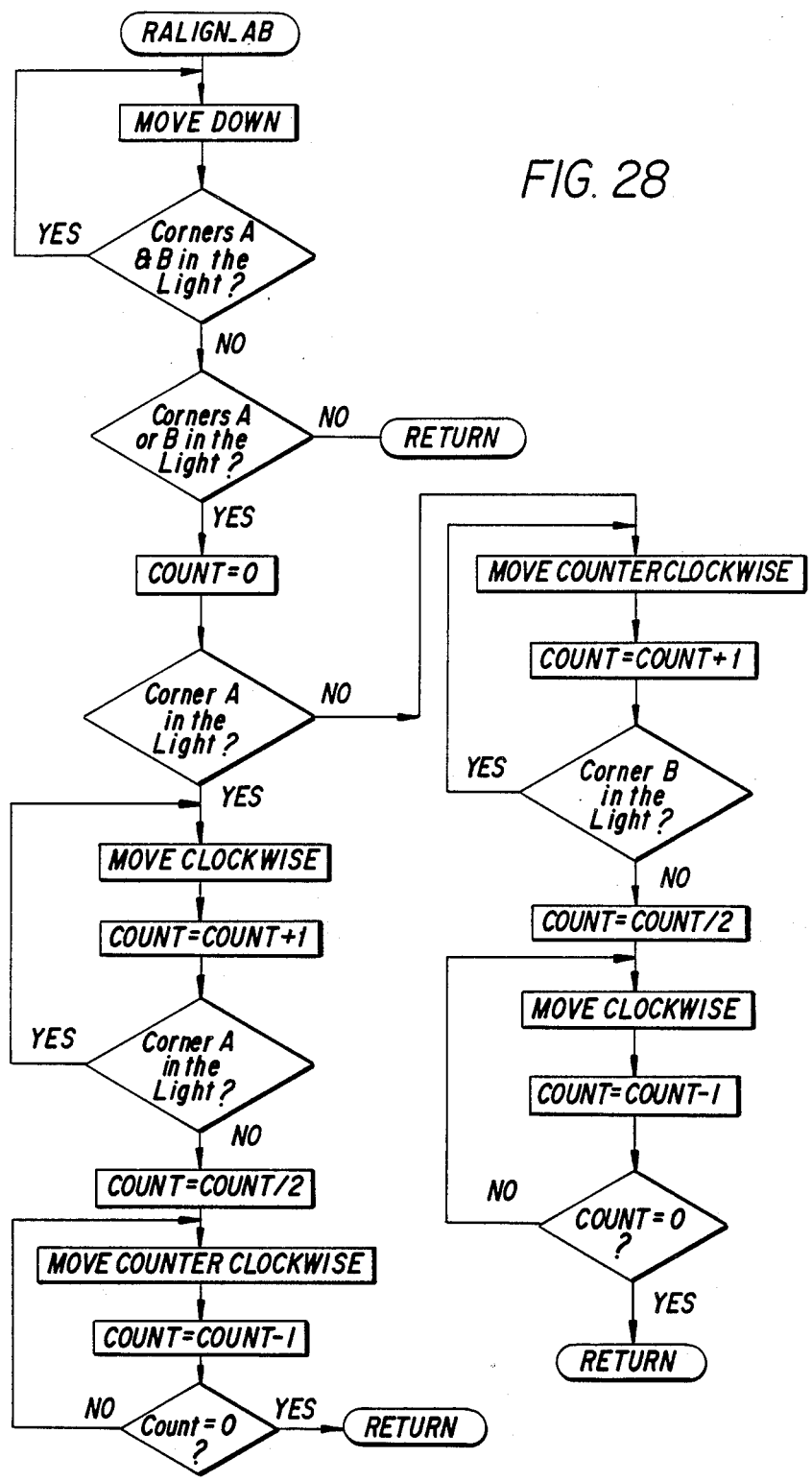

Upon conclusion of the very gross X axis alignment, the gross rotational alignment is accomplished (flowblock 222 of FIG. 21) by a subroutine RALIGN CD (FIG.27) in a manner similar to that described previously with reference to FIGS. 4D through 4G. The other rotational alignment routine RALIGN AB of FIG. 28 operates in a similar manner.

Figure 29:
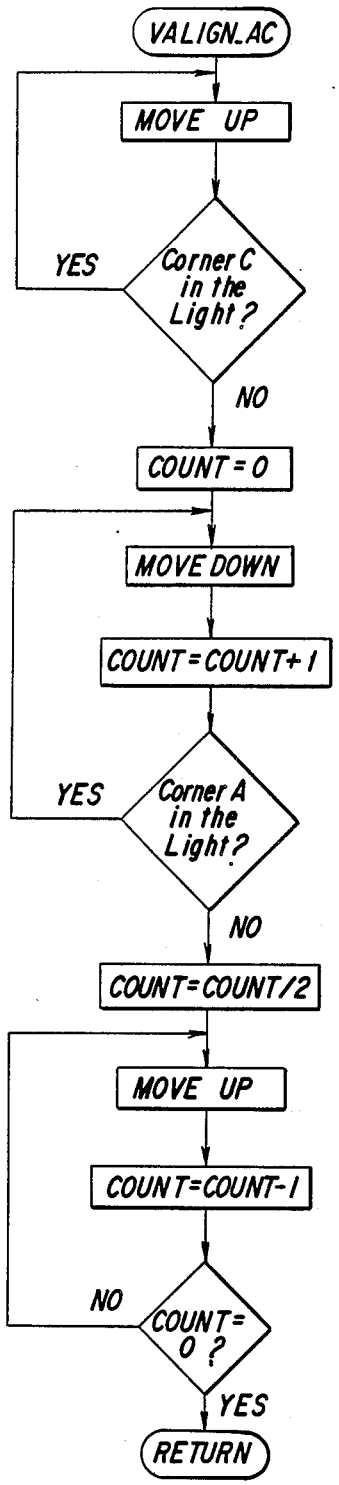
FIGS. 29 and 30 are flowcharts for achieving gross and fine alignment of the sensor along a Y axis.
Figure 30:
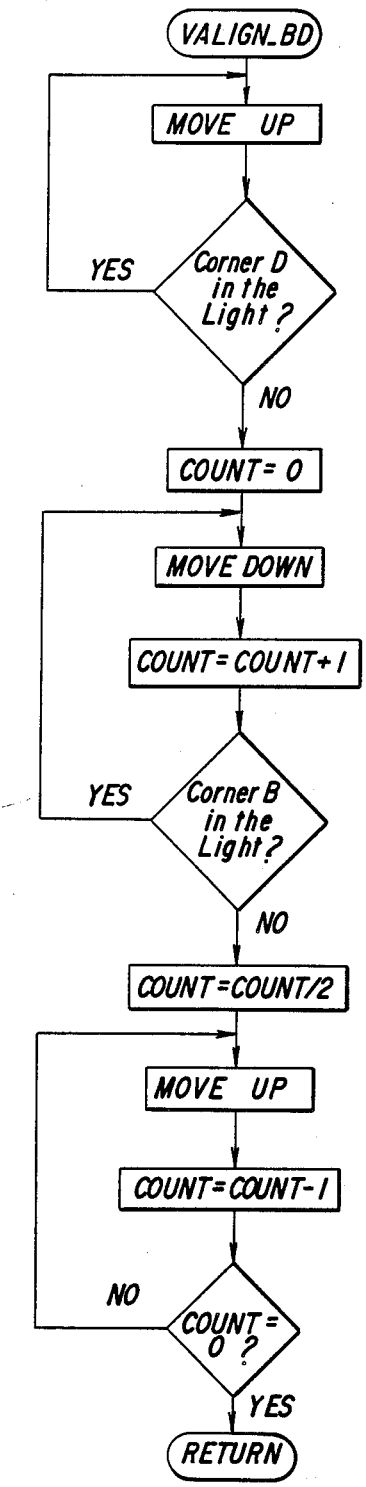

Having completed the gross rotational alignment, the gross vertical alignment is achieved (flowblock 224 of FIG. 21) in accordance with routines VALIGN AC and VALIGN BD which are flowcharted in FIGS. 29 and 30. The routine VALIGN AC operates as described previously with regard to FIGS. 4G through 4J. The other Y axis alignment routine VALIGN BD of FIG. 30 operates in a similar manner.

Figure 31:
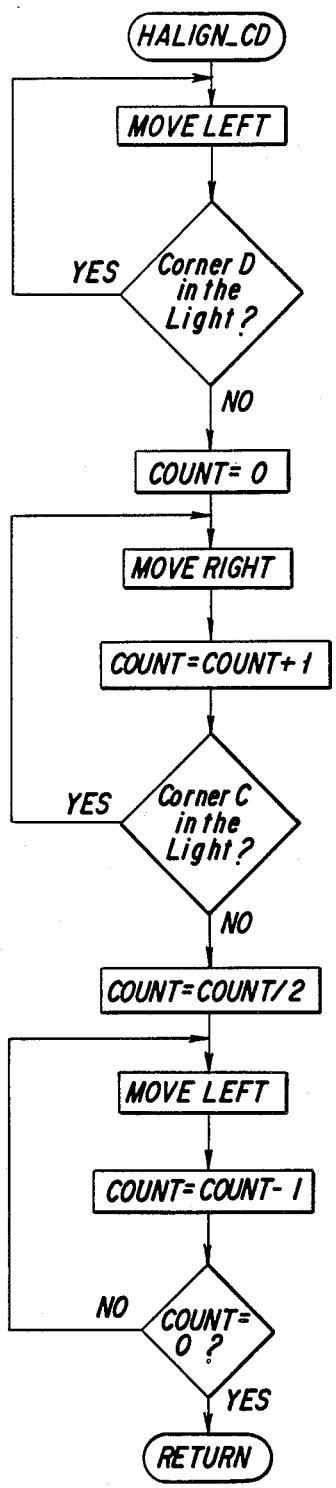
FIGS. 31 and 32 are flowcharts for achieving gross and fine alignment of the sensor along the X axis.
Figure 32:
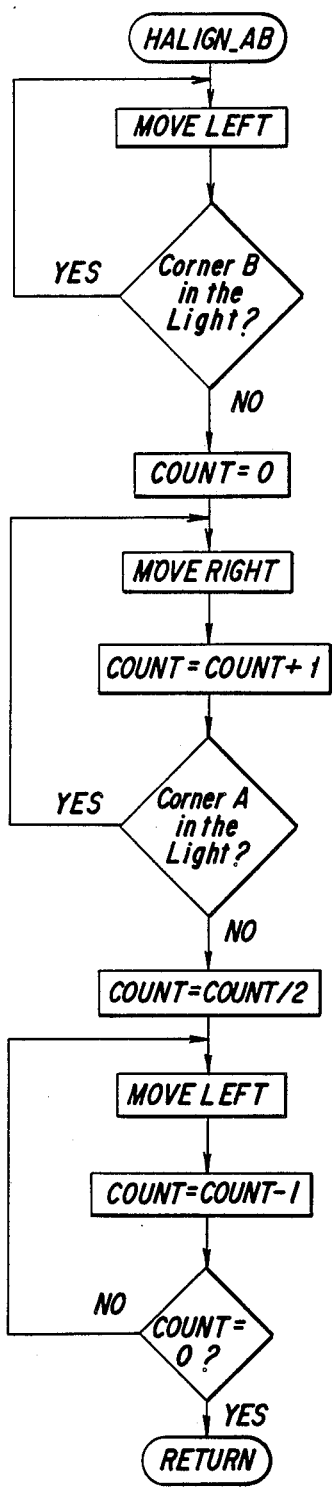

Upon completion of the gross vertical alignment, the gross horizontal alignment is achieved (flowblock 226 of FIG. 21) by means of horizontal alignment routine HALIGN CD which is flowcharted in greater detail at FIG. 31. This routine operates in a similar manner to the HALIGN ACD routine. In this manner an approximate alignment of the sensor is achieved. The HALIGN AB routine flowcharted in FIG. 32 operates in a similar manner.

The slave processors are then initialized (flowblock 228 in FIG. 21) in the manner discussed previously, and the zoom magnification is also calculated (flowblock 230) and relayed to the zoom processor in the manner discussed previously. Focus adjustment in preparation for fine alignment of the sensor is accomplished (flowblock 232) as discussed previously.

Fine rotational alignment (flowblock 234), fine vertical alignment (flowblock 236) and fine horizontal alignment (flowblock 238) are achieved using the previously discussed routines indicated in the referenced flowblocks. With the fine alignment completed, the processor slaves are reinitialized (flowblock 240). The zoom magnification is recalculated (flowblock 242) and related to the zoom processor. The lens and sensor are zoomed to the one times magnification (1X) position (flowblock 244). The alignment procedure terminates with the mask-to-film plane adjustment (flowblock 246) discussed previously.

What is claimed is:

1. Apparatus which transfers to video an image previously recorded on a photographic medium such as film or a print, said apparatus comprising:
    a. sensor means for generating a first output signal in response to light energy;
    b. light means for directing light energy toward the sensor means;
    c. means for masking at least part of the light energy from reaching the sensor means;
    d. means, responsive to the first output signal, for detecting a remaining part of the light energy which reaches the sensor means; and
    e. means for repositioning the sensor means relative to the masking means until a change in the amount of light reaching the detecting means is determined in order to identify an edge of the masking means, the repositioning means including: (i) means for moving the sensor means relative to the masking means and (ii) means for generating an edge signal when an edge of the mask is identified, the moving means being responsive to the edge signal in order to orient the sensor means relative to the masking means.

2. The apparatus as set forth in claim 1 wherein:
    a. the detecting means includes means for detecting the absence of light energy at a selected location of the sensor means in order to indicate the presence of the edge of the masking means at the selected location, and means for generating the edge signal when the absence of the light energy is detected; and
    b. the repositioning means includes means for moving the sensor means until the edge signal is generated in order to determine a location of at least one edge of the masking means, and means for moving the sensor means in response to the edge signal in order to orient the sensor means relative to the edge.

3. The apparatus of claim 2 further comprising:
means for holding said photographic medium in a photographic plane;
means for holding said means for masking in a mask plane generally parallel to said photographic plane;
lens focusing means located in a lens plane lying between said sensor means and said mask plane, wherein said sensor means is characterized by an aperture plane generally parallel to said mask plane, whereby said sensor plane and said lens plane are each displaced by different distances from said mask plane; and wherein said means for repositioning comprise means for adjusting (1) the distance between said lens plane and said mask plane and (2) the distance between said sensor plane and said mask plane, until said means for masking are in sharp focus when viewed at said sensor plane.

4. The apparatus of claim 3 wherein the distance between said mask plane and said photographic plane lies in the range of zero to a finite distance.

5. The apparatus of claim 4 wherein said repositioning means moves said sensor means and said lens means towards said film plane by a distance equal to said displacement between said mask plane and said film plane upon bringing said mask plane into sharp focus at said sensor, whereby said apparatus automatically brings said film plane into sharp focus when viewed at said sensor upon being activated regardless of the initial distance between said means for masking and said lens means and the initial difference between said means for masking and said sensor means.

6. The apparatus of claim 3 wherein said sensor means is characterised by plural corners lying in said sensor plane, and wherein said means for repositioning includes rotation processor means for rotating in a first direction said sensor in said sensor plane through an angle subtending first and second positions in which first and second adjacent corners of said sensor are blanked out by an edge of said masking means, and then rotating in an opposite direction said sensor means in said sensor plane by half said angle, so as to correct rotational tilt at said sensor means.

7. The apparatus of claim 3 wherein said sensor means is characterised by plural corners lying in said sensor plane, and wherein said means for repositioning includes alignment processor means for translating said sensor in a direction parallel to an edge of said mask means across a distance spanning first and second points at which first and second opposite corners of said sensor means are blocked from said light source, and then returning said sensor means by half said distance, whereby to reduce an initial misalignment in the direction of said translation.

8. The apparatus of claim 3 wherein said sensor means is characterized by plural corners lying in said sensor plane, and wherein said means for repositioning includes processor means for determining the magnification of said lens means by computing the distance by which said sensor means must be linearly translated between first and second positions at which first and second opposing corners of said sensor means are blanked from said light source, and determining the magnification of said lens from (1) said distance, (2) the size of said means for masking and (3) the size of said sensor means.

9. The apparatus of claim 3 wherein said sensor means is characterized by plural corners, and wherein said means for repositioning includes error flagging processor means for generating an error flag whenever either (1) linear translation of said sensor means beyond a predetermined linear distance fails to cause opposite corners of said sensor means to be blanked from said light source, or (2) rotation of said sensor means beyond a predetermined angle fails to cause adjacent corners of said sensor means to be blanked from said light source, signifying one of:

a. the magnification power of said lens means lies beyond an appropriate maximum or minimum value, or
  b. said light source is defective, or
  c. at least one of the corners in said sensor means is defective.

10. The apparatus of claim 3 wherein said sensor means is characterized by plural corners, said repositioning means including alignment and focusing sequence processing means for:

a. linearly translating said sensor along an X direction between first and second positions at which first and second opposing corners of said sensor means are blanked from said light source and moving said sensor back by half said distance.
  b. rotating said sensor through an angle subtending first and second positions at which first and second adjacent corners of said sensor means are blanked from said light source and rotating said sensor in the opposite direction by half said angle, linearly translating said sensor in a Y direction orthogonal to said X direction between two points at which opposing corners of said sensor means are blanked from said light source and returning said sensor means by half said distance and linearly translating said sensor means along said X direction between two points at which opposite corners of said sensor means are blocked from said light source and returning said sensor means by half said distance, whereby an initial linear alignment of said sensor with respect to said mask is obtained, and
  c. moving said sensor until an edge of said mask is aligned within the plane and aperture of said sensor and changing the distance between said lens means and said masking means and the distance between said sensor means and said masking means until the image of said mask edge obtains a maximum sharpness when viewed at said sensor.

11. The apparatus of claim 10 wherein, as soon as said alignment and focus sequence processor means senses that said image of said mask edge has reached a maximum sharpness when viewed at said sensor means, it reperforms the function of (b), whereby the accuracy of said alignment process is further enhanced by the sharpening of said mask edge image at said sensor means.

* * * * *

UNITED STATES PATENT AND TRADEMARK OFFICE
CERTIFICATE OF CORRECTION

PATENT NO. : 4,875,103
DATED : October 17, 1989
INVENTOR(S) : Mark E. Bridges, Robert W. Easterly and John R. Fredlund It is certified that error appears in the above-identified patent and that said Letters Patent is hereby corrected as shown below:

Col. 11, line 24 "difference" should read --distance--.

Signed and Sealed this

Eighteenth Day of September, 1990

Attest:

HARRY F. MANBECK, JR.

Attesting Officer

Commissioner of Patents and Trademarks